United States Patent
Kim et al.

(10) Patent No.: US 11,519,148 B2
(45) Date of Patent: Dec. 6, 2022

(54) WATER-OIL SEPARATION DEVICE

(71) Applicant: SEOUL NATIONAL UNIVERSITY R&DB FOUNDATION, Seoul (KR)

(72) Inventors: Yong Hyup Kim, Seoul (KR); Youn Jeong Choe, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 0 days.

(21) Appl. No.: 17/297,569

(22) PCT Filed: May 19, 2020

(86) PCT No.: PCT/KR2020/006560
§ 371 (c)(1),
(2) Date: May 27, 2021

(87) PCT Pub. No.: WO2020/235920
PCT Pub. Date: Nov. 26, 2020

(65) Prior Publication Data
US 2022/0018077 A1    Jan. 20, 2022

(30) Foreign Application Priority Data
May 21, 2019   (KR) .................. 10-2019-0059461

(51) Int. Cl.
*E02B 5/04* (2006.01)
*E02B 15/04* (2006.01)
(Continued)

(52) U.S. Cl.
CPC ........ *E02B 15/045* (2013.01); *B01D 17/0211* (2013.01); *B01D 17/0214* (2013.01);
(Continued)

(58) Field of Classification Search
CPC ....... E02B 15/045; E02B 15/10; E02B 15/106
(Continued)

(56) References Cited

U.S. PATENT DOCUMENTS 1,450,545 A * 4/1923 Hans ............... E02B 15/106
                                                       210/122
3,556,301 A * 1/1971 Smith ............... E02B 15/10
                                                       210/776
(Continued)

FOREIGN PATENT DOCUMENTS

DE        9406918    *  8/1994
EP         819198    * 10/1996
(Continued)

OTHER PUBLICATIONS

Machine translation of KR 20090008716, Jan. 2009 (Year: 2009).*
(Continued)

*Primary Examiner* — Christopher Upton

(57) ABSTRACT

A water-oil separation device uses a difference in density between water and oil. The water-oil separation device can easily and quickly separate oil by using a polymer film floating at interface between water and oil. The water-oil separation device easily and quickly collects oil of various viscosities with a simple structure by using differences in density between materials without using a conventional lyophilic/lyophobic film, thus solving the drawbacks of conventional filter-based and adsorption-based methods, and enabling quick and effective responses to actual oil spill situations.

12 Claims, 26 Drawing Sheets

(51) Int. Cl.
*C08K 3/04* (2006.01)
*B01D 17/02* (2006.01)
*C08J 5/18* (2006.01)
*E02B 15/10* (2006.01)

(52) U.S. Cl.
CPC ............... *C08J 5/18* (2013.01); *C08K 3/042* (2017.05); *E02B 15/10* (2013.01); *E02B 15/106* (2013.01); *C08J 2323/06* (2013.01)

(58) Field of Classification Search
USPC ...... 210/122, 170.05, 170.09, 170.11, 242.3, 210/747.6, 776, 923
See application file for complete search history.

(56) References Cited

U.S. PATENT DOCUMENTS

| | | | | |
|---|---|---|---|---|
| 3,578,171 A * | 5/1971 | Usher | ............... | E02B 15/106 210/242.3 |
| 3,693,800 A * | 9/1972 | Stanfield | ............... | E04H 4/1263 210/242.3 |
| 3,730,346 A * | 5/1973 | Prewitt | ............... | E02B 15/106 210/776 |
| 3,831,756 A * | 8/1974 | Bhuta | ............... | E02B 15/106 210/776 |
| 4,935,152 A * | 6/1990 | Gonzales | ............... | E02B 15/06 210/747.6 |
| 5,118,412 A * | 6/1992 | Schmidt | ............... | E02B 15/106 210/242.3 |
| 5,141,632 A * | 8/1992 | Catcher | ............... | E02B 15/106 210/923 |
| 5,292,433 A * | 3/1994 | Fletcher | ............... | E02B 15/106 210/170.05 |
| 2014/0014565 A1 * | 1/2014 | Qin | ............... | E02B 15/10 210/242.4 |
| 2015/0284269 A1 * | 10/2015 | Hwang | ............... | E02B 15/045 210/490 |
| 2021/0039018 A1 * | 2/2021 | Rojas | ............... | E02B 15/106 |

FOREIGN PATENT DOCUMENTS

| | | |
|---|---|---|
| JP | 2014-503716 A | 2/2014 |
| KR | 10-0417337 B1 | 2/2004 |
| KR | 10-2009-0008716 A | 1/2009 |
| KR | 10-2014-0002971 A | 1/2014 |
| KR | 10-1423757 B1 | 8/2014 |
| KR | 10-1817842 B1 | 1/2018 |
| KR | 10-2018-0051789 A | 5/2018 |

OTHER PUBLICATIONS

Machine translation of KR 101423757, Aug. 2014 (Year: 2014).*
International Searching Authority, International Search Report for PCT/KR2020/006560 dated Sep. 4, 2020 [PCT/ISA/210].

* cited by examiner $\rho$ : density ($\rho_2 < \rho_f < \rho_1$)
g : gravitational acceleration

WATER-OIL SEPARATION DEVICE

CROSS REFERENCE TO RELATED APPLICATIONS

This application is a National Stage of International Application No. PCT/KR2020/006560 filed May 19, 2020, claiming priority based on Korean Patent Application No. 10-2019-0059461 filed May 21, 2019.

TECHNICAL FIELD

The present invention relates to a water-oil separation device using the difference in density between water and oil, and more specifically, to a water-oil separation device that can easily and quickly separate oil by using a polymer film floating at the interface between water and oil.

BACKGROUND

Large and small maritime oil spills occur all over the world. Oil and hazardous chemicals spilled at an accident spread to the coast, causing economic and physical damage to people and destroying marine ecosystems. It takes a lot of money and manpower and takes a long time to recover from such damage. In order to reduce such damage, rapid and efficient measures are needed.

For these reasons, when an accident of spilling a large amount of oil occurs in the ocean, a method of spraying an emulsifier is commonly used to prevent oil from spreading to the surroundings. However, although using an emulsifier is effective because a large amount of oil aggregates into lumps and sinks at an early stage of an accident, thereby preventing it from spreading to the surroundings, there is a problem that it is rarely effective after the oil is scattered to reach shorelines or the oil film becomes thinner.

In addition, there has been a claim continuously raised that the use of emulsifiers onto crude oil spilled into the sea would cause secondary damage from this rather than having a substantial impact on protecting ecosystems, and although the use of emulsifiers is universal because emulsifiers remove oil films and make them look as if they have disappeared, the reality is that the seriousness of the toxicity of chemical substances contained in emulsifiers has been controversial multiple times.

Oil separation techniques that do not use emulsifiers include a method of removing oil by an adsorption or filtration method utilizing the lyophilicity and lyophobicity of materials. The adsorption method that absorbs and squeezes out oil with such lipophilic/hydrophobic materials can remove even oils of high viscosity; however, there exist problems that it cannot continuously separate oil and the oil absorbed must be sucked with a pump by applying power for continuous separation.

In addition, the filter method is a technique of filtering oil and water by coating or depositing materials having hydrophilic/lipophobic or lipophilic/hydrophobic properties on a mesh or membrane, or making a mesh or membrane directly from materials having the above properties. In this case, although there is an advantage of being able to continuously and quickly filter the desired oil or water, there are drawbacks that since the holes in the filter are small, the holes in the filter get clogged and the oil separation rate becomes very slow or the filter itself cannot be used when the viscosity of oil increases.

As other oil recovery methods, there have been provided techniques for recovering only oil by using the difference in specific gravity between water and oil. For example, Korean Patent No. 10-0417337 provides an apparatus for separating water and oil of a natural circulation type configured to cause a mixed fluid of water and oil to flow through three or more sets of consecutive circulation tanks installed in an oil recovery vessel and to separate and collect oil from water by the difference in specific gravity between water and oil during movement, and Korean Patent No. 10-1817842 provides floating-type oil recovery equipment capable of efficiently recovering oil without mixing wastewater by floating on the water surface. However, such oil recovery devices have disadvantages that the cost is high or the frequency of failure is high because the equipment is complex, and it is difficult to recover oil precisely.

Under such circumstances, the present inventors have developed a water-oil separation device capable of recovering a large amount of oil easily and quickly with a simple structure, to complete the present invention.

SUMMARY OF INVENTION

Technical Objects

It is an object of the present invention to solve the problems described above, and to provide a water-oil separation device capable of rapidly recovering oil spilled into the water with a simple structure and manufacturing method.

Technical Solution

In order to achieve the above object, the present invention provides a water-oil separation device for separating oil floating on water, the device comprising:

(a) a polymer film having a density lower than the density of water and higher than the density of oil, so as to be configured to float between water and oil, and having a recovery hole for recovering oil;

(b) an oil recovery tube connected to the recovery hole and configured to move oil located on the polymer film; and (c) an oil recovery container connected to an end of the oil recovery tube and configured to store recovered oil.

In the present invention, the polymer film is preferably selected from the group consisting of ultra-high-molecular-weight polyethylene (UHMWPE), ultra-low-molecular-weight polyethylene (ULMWPE), high-molecular-weight polyethylene (HMWPE), high-density polyethylene (HDPE), high-density cross-linked polyethylene (HDXLPE), cross-linked polyethylene (XLPE), medium-density polyethylene (MDPE), linear low-density polyethylene (LLDPE), low-density polyethylene (LDPE), very-low-density polyethylene (VLDPE), chlorinated polyethylene (CPE), isotactic polypropylene (iPP), syndiotactic polypropylene (sPP), atactic polypropylene (aPP), homo-polypropylene (homo-PP), random-polypropylene (random-PP), ter-polypropylene (ter-PP), block-polypropylene (block-PP), acrylonitrile butadiene styrene (ABS), poly (l-butene), polymethylpentene, and ethylene-vinyl acetate copolymer (EVA).

In the present invention, the polymer film is preferably in the form of a composite film with a carbon-based material selected from the group consisting of graphene, graphene oxide (GO), reduced graphene oxide (rGO), carbon nanotubes, carbon fibers, and carbonaceous nanoplates.

In the present invention, the composite film may contain 0.1 to 10% by weight of the carbon-based material based on the weight of the polymer film.

In the present invention, the oil recovery tube preferably has an inner diameter of 2 mm or larger.

In the present invention, a part where the oil recovery tube and the oil recovery container are connected is preferably located below a water surface.

In the present invention, the density of the polymer film is preferably 0.50 to 1.030 g/cm$^3$.

In the present invention, the composite film may be prepared by a method comprising:

(a) dissolving a polymer in a first solvent to prepare a polymer solution;

(b) dispersing a carbon-based material in a second solvent to prepare a carbon-based material solution;

(c) mixing the polymer solution and the carbon-based material solution;

(d) adding the mixed solution to a third solvent to obtain carbon/polymer composite particles; and (e) molding the carbon/polymer composite particles to produce a carbon/polymer composite film.

In the present invention, the first and second solvents may be selected from the group consisting of toluene, xylene, hexane, cyclohexane, benzene, chlorobenzene, chloroform, butane, trichloroethylene, acetone, tetrachloride, diethyl ketone, methyl ethyl ketone, methyl propyl ketone, methylene chloride, phenol, tetrahydrofuran, and diethyl ether.

In the present invention, the molding may be performed by hot pressing, and the hot pressing may be performed with a pressure of 10 to 10,000,000 N/m$^2$ at a temperature of 110 to 180° C.

In the present invention, the polymer film may further comprise a film shape-maintaining means for maintaining the shape of the film.

Further, in the present invention, one or more of the polymer film and the oil recovery tube may further comprise a heat generating means.

Effects of the Invention

The water-oil separation device in accordance with the present invention can easily and quickly recover oils of various viscosities with a device of a simple structure by using differences in density between materials rather than using a conventional lyophilic/lyophobic film, thus solving the drawbacks of both the filter-based and adsorption-based methods of conventional research, and enabling quick and effective responses to actual oil spill situations.

BRIEF DESCRIPTION OF THE DRAWINGS

FIG. 7 (*b*) is a graph showing the diameter of prepared films according to the pressure of a hot press in one example of the present invention.

FIG. 13 (*b*) is a graph showing the immersion depths according to the diameter of the LDPE film and the rGO/LDPE film.

FIG. 14 (*b*) is a graph showing the magnitude of the force exerted on a bar according to the diameter of the LDPE film and the rGO/LDPE film.

FIGS. 15 (*a*) and 15(*b*) show perspective and cross-sectional views of the experimental apparatus, and FIG. 15 (*c*) shows a state in which an oil layer on water gradually rides on a silicone tube and moves to an oil recovery container.

FIG. 17 (*b*) is an image of a device in which a recovery container is sunk to the bottom of the water tank.

DETAILED DESCRIPTION OF EMBODIMENTS

Hereinafter, implementations of the present invention will be described in detail with reference to the drawings. The following description is merely for easy understanding of the implementations of the present invention, and is not intended to limit the scope of protection.

The present invention relates to an oil recovery device using the difference in density between water and oil, and to a water-oil separation device using the difference in density between materials rather than oil separation using conventional lyophilicity/lyophobicity in order to maintain high oil recovery performance and recover oils of various viscosities.

The present invention relates to a device for recovering oil floating on water, the oil recovery device comprising: (a) a polymer film having a density lower than that of water and higher than that of oil, so as to be configured to float between water and oil, and having a recovery hole for recovering oil; (b) an oil recovery tube connected to the recovery hole and configured to move oil located on the polymer film; and (c) an oil recovery container connected to an end of the oil recovery tube and configured to store recovered oil.

Figure 1A:
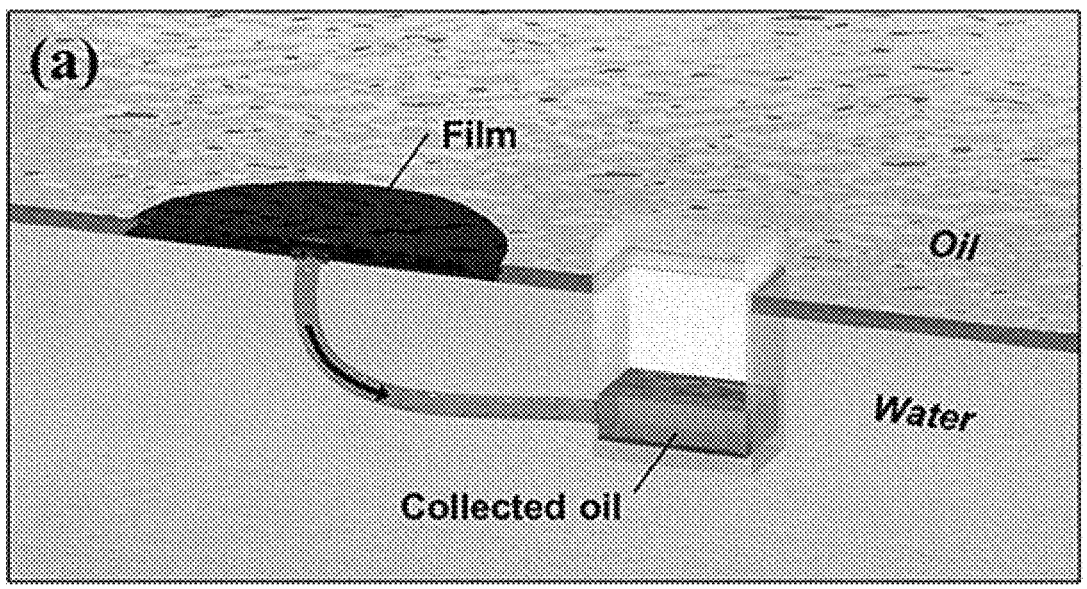
FIG. 1(*a*) and FIG. 1(*b*) show a water-oil separation device in accordance with a preferred embodiment of the present invention.
Figure 1B:
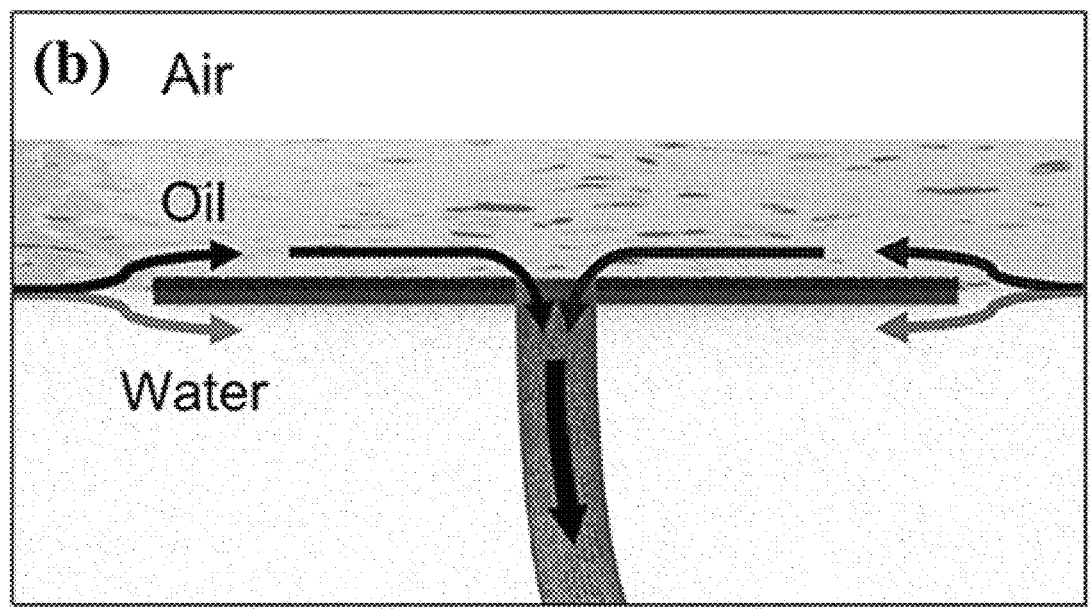

An exemplary form in which the device of the present invention is used to recover oil spilled into the ocean is illustrated in FIG. 1. In FIG. 1, the device of the present invention is configured such that a film having a density lower than that of the sea and higher than that of the spilled oil can float on the sea where the oil has spilled, and the oil on the polymer film can be recovered to the oil recovery container through the recovery tube connected to the recovery hole.

Figure 2:
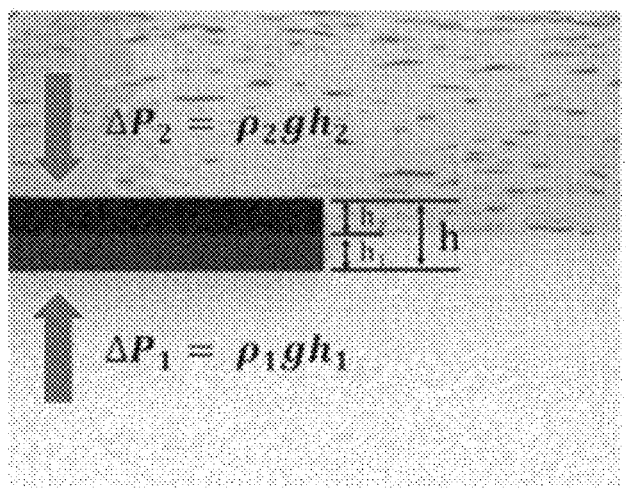
FIG. 2 shows the positional relationship between two liquids having different densities and a film having an intermediate density between the two liquids.

As shown in FIG. 2, when liquids 1 and 2 having different densities are present in layers due to the difference in density, a film having a density between the densities of the two liquids is positioned between the two liquids. In the present invention, an attempt has been made to recover oil floating on water with high efficiency by utilizing a polymer film that can float between water and oil.

In the present invention, as the film that can be positioned between water and oil, a polymer film such as ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), chlorinated polyethylene (CPE), isotactic polypropylene (iPP), syndiotactic polypropylene (sPP), atactic polypropylene (aPP), homo-polypropylene (homo-PP), random-polypropylene (random-PP), ter-polypropylene (ter-PP), block-polypropylene (block-PP), acrylonitrile butadiene styrene (ABS), poly(1-butene)), polymethylpentene, ethylene-vinyl acetate copolymer (EVA), etc., may be selected, and out of these, it is desirable to use low-density polyethylene (LDPE).

Figure 3:
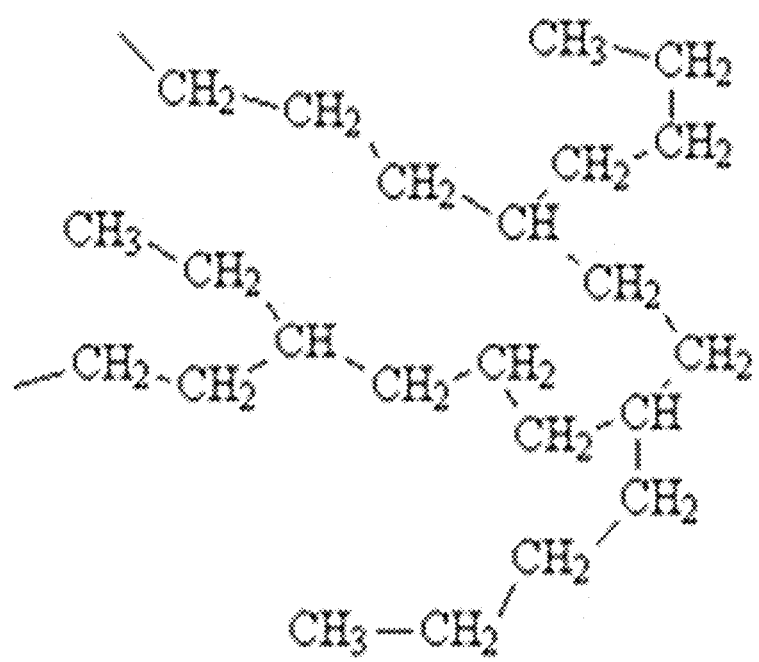
FIG. 3 shows the molecular structure of low-density polyethylene.

Polyethylene (PE) is a compound having a chain structure consisting of carbon (C) and hydrogen (H), has excellent chemical resistance, and can be easily molded by applying heat or pressure. Polyethylene can have various densities depending on the chain structure of the molecule, and low-density polyethylene of a structure having many branches as shown in FIG. 3 has a low density of around 0.88 to 0.96 $g/cm^3$. This value is higher than the density of kerosene (0.78 to 0.81 $g/cm^3$) and lower than the density of water, which is advantageous for being stably positioned between water and oil.

In the present invention, the density of the polymer film may be adjusted differently depending on the density of solvents or oils to be recovered. For example, if it is intended to recover heavy oil floating on seawater, it is desirable to use a polymer film having a density lower than the density of seawater of 1.02 to 1.03 $g/cm^3$ and higher than the density of heavy oil of 0.88 to 0.99 $g/cm^3$. Further, since hexane, which is a light organic solvent, has a density of 0.6 $g/cm^3$, it is desirable for the polymer film of the present invention to have a density of 0.50 to 1.030 $g/cm^3$.

In the present invention, it is preferable to add a carbon-based material to impart hydrophobicity to the polymer film, to prepare and use a carbon/polymer composite film. As the carbon-based material, graphene, graphene oxide (GO), reduced graphene oxide (rGO), carbon nanotubes, carbon fibers, carbonaceous nanoplates, etc. may be used, and it is desirable to use reduced graphene oxide (rGO).

Graphene is of a hexagonal structure consisting of carbon (C) and has excellent electrical and thermal conductivity and mechanical strength as well. As methods for obtaining graphene, mechanical exfoliation, chemical growth using chemical vapor deposition (CVD), chemical exfoliation of graphite, etc., have been used.

One of the most widely used methods to obtain reduced graphene oxide is to chemically oxidize graphite, then exfoliate and reduce it again. The graphene thus obtained is called reduced graphene oxide (rGO). The advantages of rGO are that synthesis is made easy by using the functional groups attached to the structure in the form of graphene oxide when synthesizing with other materials, and after the synthesis is completed, desired materials can be easily produced through reduction processes such as thermal reduction and chemical reduction.

Graphene oxide (GO) has hydrophilicity of interacting well with polar materials such as water since there are a number of functional groups such as an ether group (O), a hydroxy group (—OH), a carboxyl group (—COOH), etc. However, if the functional groups of graphene oxide are removed through reduction processes, the interaction with polar materials decreases, thereby exhibiting hydrophobicity. In one embodiment of the present invention, reduced graphene oxide is applied to a low-density polyethylene film to increase the hydrophobicity of the film, so that the film can be positioned more stably at the interface between water and oil.

The carbon-based material is added preferably in an amount of 0 to 10% by weight, more preferably in an amount of 0.1 to 5% by weight, and most preferably in an amount of 0.5 to 2% by weight, based on the total weight of the polymer film. If an excessive amount of the carbon-based material is added, the content of the polymer film may be insufficient, thereby causing a problem of being unable to maintain the external shape thereof and being crumbled.

In the present invention, the carbon/polymer composite film may comprise (a) dissolving a polymer in a first solvent to prepare a polymer solution; (b) dispersing a carbon-based material in a second solvent to prepare a carbon-based material solution; (c) mixing the polymer solution and the carbon-based material solution; (d) adding the mixed solution to a third solvent to obtain carbon/polymer composite particles; and (e) molding the carbon/polymer composite particles to prepare a carbon/polymer composite film.

Figure 4:
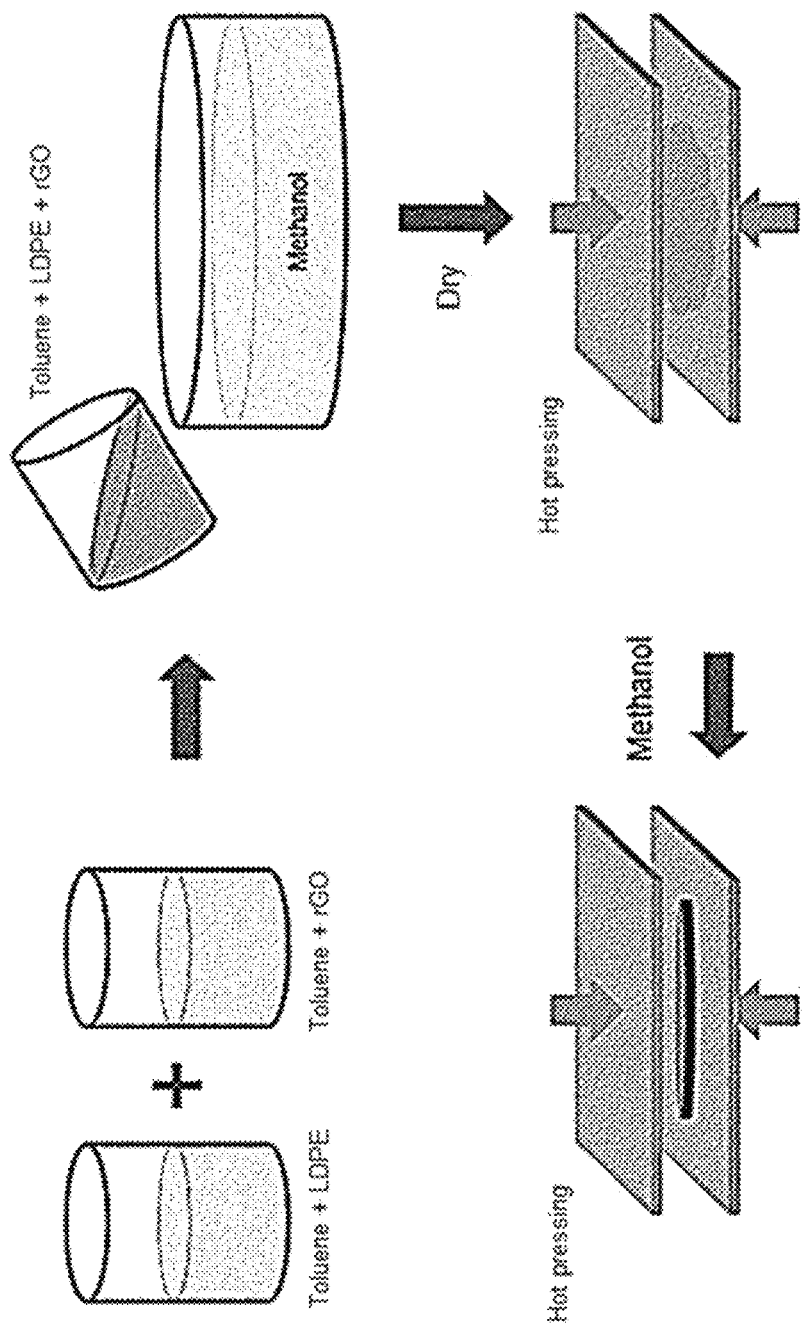
FIG. 4 shows a preparation process diagram of a reduced graphene oxide/low-density polyethylene composite film of the present invention.

A process for preparing a reduced graphene oxide/low-density polyethylene composite film in accordance with a preferred embodiment of the present invention is illustrated in FIG. 4. The method for preparing the reduced graphene oxide/low-density polyethylene composite film may comprise (a) dissolving low-density polyethylene in a first solvent to prepare a low-density polyethylene solution; (b) dispersing reduced graphene oxide in a second solvent to prepare a reduced graphene oxide solution; (c) mixing the low-density polyethylene solution and the reduced graphene oxide solution; (d) adding the mixed solution to methanol to obtain reduced graphene oxide/low-density polyethylene composite particles; and (e) hot-pressing the reduced graphene oxide/low-density polyethylene composite particles to prepare a reduced graphene oxide/low-density polyethylene composite film.

In the method of the present invention, the first and second solvents each preferably uses, independently, solvents selected from toluene, xylene, hexane, cyclohexane, benzene, chlorobenzene, chloroform, butane, trichloroethylene, acetone, tetrachloride, diethyl ketone, methyl ethyl ketone, methyl propyl ketone, methylene chloride, phenol, tetrahydrofuran, diethyl ether, etc., and it is most preferable to use a toluene solvent.

The polymer is preferably dissolved at a concentration of 1 to 10% by weight in the first solvent. The dissolution may be carried out for a desired temperature and time depending on the types of polymer, and if low-density polyethylene is dissolved, it may be performed by heating at 70 to 100° C. for 1 to 3 hours.

Next, a carbon-based material is prepared and dissolved in a second solvent. If reduced graphene oxide is used as the carbon-based material, the reduced graphene oxide can be obtained by heat-treating graphene oxide powder at 200 to 250° C. for 4 to 6 hours and preferably at 220° C. for 5 hours.

The carbon-based material, for example, the reduced graphene oxide is preferably dispersed in the second solvent at a concentration of 0.1 to 10 mg/ml, and more preferably at a concentration of about 1 mg/ml. When dispersing, it is desirable to uniformly disperse through sonication.

After mixing the polymer solution and the carbon-based material solution, the mixed solution may be added to the third solvent, so that the composite of the polymer and the carbon-based material is coagulated and obtained in the form of particles. As the third solvent, it is preferable to use methanol, ethanol, propanol, isopropyl alcohol, butanol, pentanol, hexanol, heptanol, octanol, nonanol, decanol, dichloroethane, dichloromethane, etc., and methanol is most preferred.

Once the carbon/polymer composite particles are obtained, they may be dried and then be subjected to hot pressing using a hot press, thereby preparing a carbon/polymer composite film.

For the carbon/polymer composite of the present invention, the carbon/polymer composite particles may also be obtained using such methods as melt extrusion, a roller mill, a co-rotating twin screw extruder, melt blending, ball milling, Ziegler-Natta polymerization method, etc., in addition to the coagulation process, and then be subjected to hot pressing using a hot press, thereby preparing a carbon/polymer composite film.

Here, the hot pressing is preferably performed at 110 to 180° C., and more preferably at 115 to 160° C.

In addition, the hot pressing may be performed by applying a pressure of 10 to 10,000,000 N/m$^2$ for 10 to 30 minutes.

In the present invention, the thickness and diameter of the carbon/polymer composite film may be controlled by adjusting the pressure of the hot pressing. For example, if 1 g of carbon/polymer composite particles are pressed to produce a film, a film having a thickness of 100 to 300 µm and a diameter of 6 to 12 cm can be prepared, and the thickness and diameter may be set differently by controlling such factors as the amount of the composite particles, pressure, etc., as necessary.

In the present invention, it is preferable for the carbon/polymer composite film to have a thickness of 10 µm or higher and a diameter of 5 cm or higher in terms of floating stability at the interface.

The film prepared may be immersed again in the third solvent to remove any remaining solvent that might have left during the coagulation process of the composite, and then be subjected to hot pressing once more in the hot press under the same conditions, thereby finally preparing a carbon/polymer composite film.

The low-density polyethylene film in accordance with one embodiment of the present invention is basically a white translucent film, but if prepared in the form of a composite with reduced graphene oxide, it is prepared as a black film, and has basically a circular film shape because it is prepared by hot pressing.

The reduced graphene oxide/low-density polyethylene composite film of the present invention has hydrophobic and lipophilic properties. Therefore, the film does not get wet with water and sink in water but adheres more strongly to oil, and can stably float at the interface between water and oil. In particular, since the film withstands well against external impacts or the force that directly presses the film, it can perform the role of stably and easily separating oil even in extreme environments such as the sea.

In the device of the present invention, it is desirable for the recovery hole to be formed with the same diameter as the inner diameter of the oil recovery tube. The recovery hole may serve as a passage through which the oil located on the film can move to the oil recovery tube.

Further, the oil recovery tube serves as a passage through which the oil located on the film can move.

In the present invention, the diameter of the recovery hole and the inner diameter of the oil recovery tube are preferably 2 mm to 5 mm, but may be adjusted to have an inner diameter appropriate for the environment to which they are applied.

The inner diameter of the oil recovery tube may be configured differently depending on the viscosity of the oil to be recovered. If it is intended to recover oil of low viscosity, the inner diameter of the oil recovery tube may be configured to be relatively small, and if it is intended to recover oil of high viscosity, the inner diameter of the oil recovery tube may be configured to be relatively large. The water-oil separation device of the present invention has an advantage of being able to quickly and easily separate oils having different viscosities and physical properties by a simple physical method of adjusting the inner diameter of the oil recovery tube.

Figure 5A:
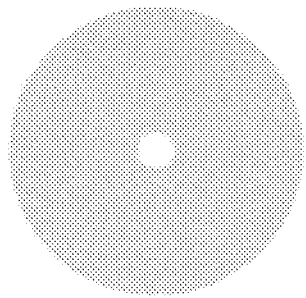
FIG. 5(*a*), FIG. 5(*b*), and FIG. 5(*c*) show an example in which a polymer film is provided with a film shape-maintaining means, in accordance with one embodiment of the present invention.
Figure 5B:
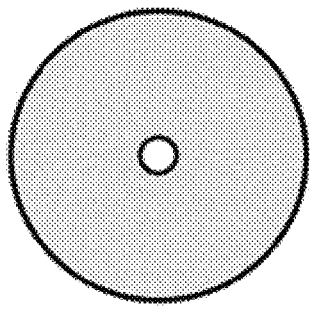
Figure 5C:
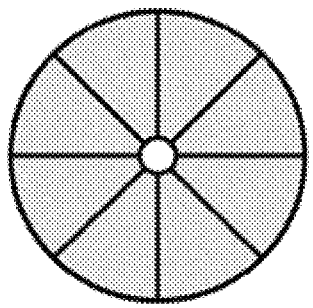

The polymer film of the present invention may also further comprise a film shape-maintaining means for improving the floating stability of the film, as illustrated in FIG. 5. Although the film shape-maintaining means may not be used at all in the polymer film of the present invention as shown in FIG. 5 (a), it may be applied to the edge of the polymer film as shown in FIG. 5 (b) or may be provided on the edge and a part of the surface of the polymer film as shown in FIG. 5 (c), to maintain the polymer film so that the shape thereof is not deformed by external impacts, etc., thereby improving the floating stability. The film shape-maintaining means is made of a material consisting of a polymer, metal, or non-metal that has rigidity capable of maintaining the shape of the film, does not dissolve in water, and does not react with water, and is of a form that does not hinder the floating state of the film.

Figure 6:
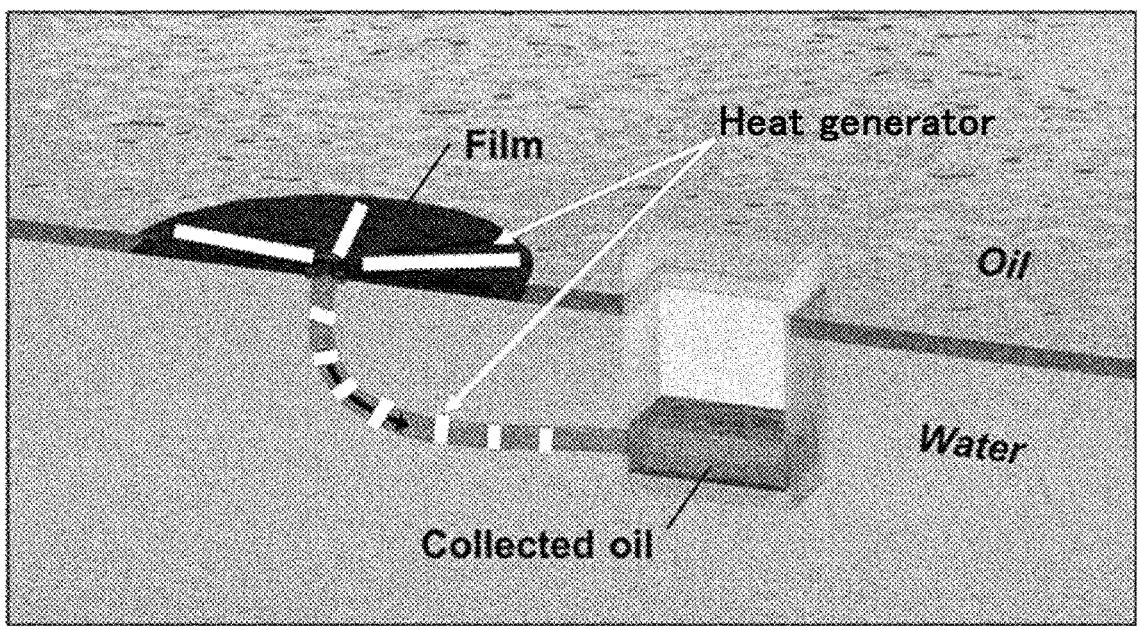
FIG. 6 shows a water-oil separation device provided with a heat generating means, in accordance with one embodiment of the present invention.

The device of the present invention may also further comprise a heat generating means in one or more components of the polymer film and the oil recovery tube, as illustrated in FIG. 6. The heat generating means may generate heat when recovering oil so as to lower the viscosity of the oil, so that the oil can be recovered at a faster recovery rate. The heat generating means may perform heat generation by a known method using a known heat source. For example, a heating element may be installed in the film or the oil recovery tube in the form of a metal heating element, a heating wire, and a removable heating element that generates heat with electric current, visible light, chemical reaction, etc. as a heat source, so as to lower the viscosity of the oil and to facilitate the recovery thereof.

The oil recovery tube may be connected to the oil recovery container, so as to allow the recovered oil to be stored in the oil recovery container. The shape of the oil recovery container is not particularly limited, but may be in the form of a container with its top open or the form of a closed container.

If the oil recovery container is a closed container, an air discharge tube may be further provided to allow the air inside to escape when the recovered oil flows into the container. It is also possible to configure such that a syringe, a pump, or the like is preferably connected to an end of the air discharge tube, so as to lower the pressure inside the container and to recover the oil more quickly and easily.

Although the oil recovery container may be located in or out of the water, it is desirable to place it in water to improve the oil recovery rate. This is because it is advantageous to ensure that the oil recovery tube does not come out of the water. Here, if the oil recovery container is in the form of a container with its top open, it may be configured such that the open part is located above the water surface and only the body portion of the container may be located in the water.

In addition, although the oil recovery container may be configured to stay afloat on the water by buoyancy, it is desirable to configure the body to be immersed in the water to some degree except for the open part for a faster oil recovery speed. That is, the lower the part where the oil recovery tube and the oil recovery container are connected than the water surface, the more the oil recovery performance can be improved.

The water-oil separation device of the present invention can exhibit an oil recovery rate of 600,000 L/m² h or more. This is a significant improvement over the previously reported oil recovery apparatus that shows an oil recovery rate of about several thousand to tens of thousands of L/m² h.

Furthermore, since the water-oil separation device of the present invention does not use the lyophilicity or lyophobicity of the film, it is not significantly affected by the viscosity or physical properties of oil, and it can quickly and easily separate oils having various viscosities and properties through simple physical adjustments such as adjusting the inner diameter of the recovery tube.

EXAMPLES

In the following, the present invention will be described in greater detail through examples. These examples are only for illustrating the present invention, and it will be apparent to those of ordinary skill in the art that the scope of the present invention is not to be construed as being limited by these examples.

Preparation Example: Preparation of rGO/LDPE Film

Low-density polyethylene (LDPE 963, Hanwha Chemical) was added to toluene to a concentration of 5% by weight, and then heated at 90° C. for 2 hours to dissolve the low-density polyethylene in toluene.

Graphene oxide (N002-PDE, Angstron Materials Inc.) powder was heat-treated at 220° C. for 5 hours, to obtain reduced graphene oxide (rGO) powder. The reduced graphene oxide powder was added to toluene to a concentration of 1 mg/ml, then was subjected to sonication to disperse appropriately.

The low-density polyethylene (LDPE) solution and the reduced graphene oxide solution were mixed, where rGO was mixed to be 0, 0.5, 1, 5, and 10% by weight, respectively, based on the weight of LDPE.

The mixed solution was slowly poured into methanol, to obtain composite particles in which the particles were agglomerated.

An amount of 1.000±0.010 g of the reduced graphene oxide/low-density polyethylene (rGO/LDPE) composite obtained was taken out and dried, and then was subjected to a pressure between 0 and 1000 lb at 150° C. for 15 minutes using a hot press, to preliminarily produce a rGO/LDPE film. In the case of 0 lb, it means that a film was prepared by applying only pressure at a level of not moving the needle on the instrument panel.

The rGO/LDPE film was immersed again in methanol to remove any remaining solvent that might have left during the coagulation process of the composite, then was taken out to dry well, and then was subjected to heat and pressure once more under the same conditions as the hot press that was carried out previously, to produce a film to be used in experiments.

Figure 7A:
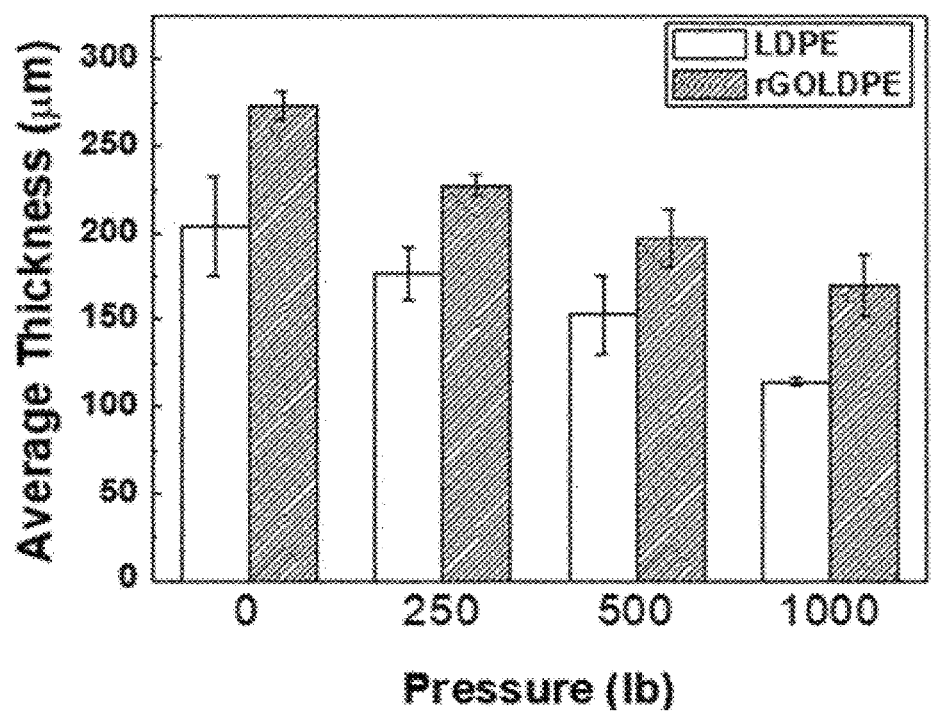
FIG. 7 (*a*) is a graph showing the thickness of prepared films according to the pressure of a hot press in one example of the present invention.
Figure 7B:
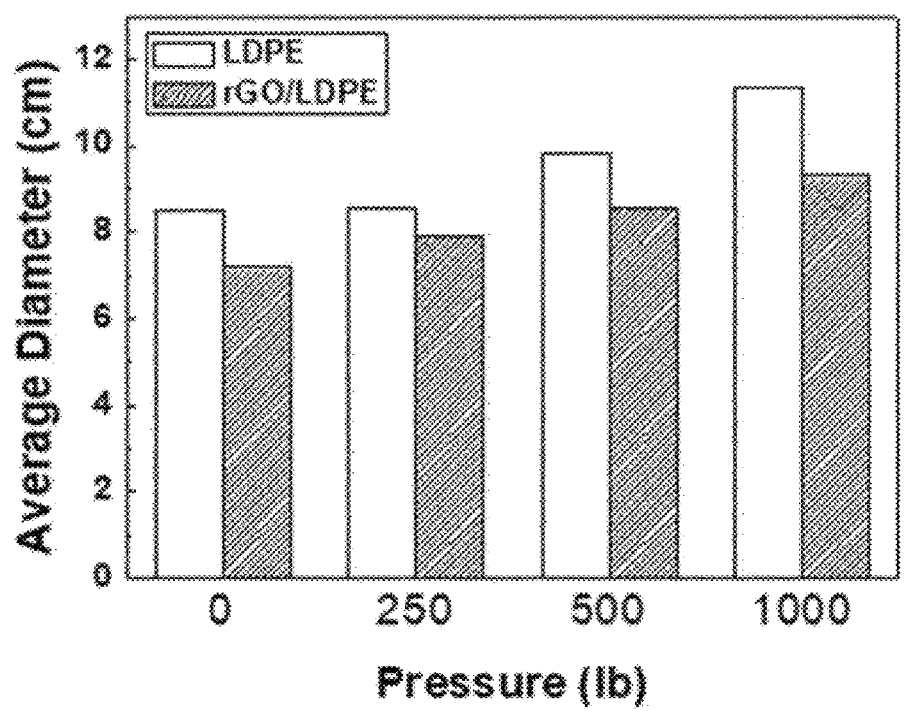

The thickness and diameter of the films prepared according to the pressure of the hot press are shown in FIGS. 7 (a) and (b), respectively.

In FIG. 7 (a), the LDPE film without containing rGO therein decreased in thickness, with an average thickness from 204 μm to 114 μm, as the pressure increased from 0 lb to 1000 lb, and the rGO/LDPE film having 1% by weight of rGO mixed therein decreased in thickness from 273 μm to 169 μm as the pressure increased.

Both types of films showed a tendency of decreasing the thickness of the film as the force applied during the hot press process increased.

In addition, although the films were prepared under the same hot press process conditions, it can be confirmed that the rGO/LDPE film is thicker than the LDPE film by about 50 to 70 μm. This is because rGO/LDPE did not spread sufficiently during the same time while the amount of LDPE decreased.

It can be confirmed from FIG. 7 (b) that the diameter of the films prepared increases as the pressure of the hot press increases. It can be seen that the LDPE film, which had a relatively thinner average thickness in FIG. 7 (a), has a larger diameter.

Experiment Example 1: Measurement of Physical Properties of rGO/LDPE Film

The physical properties of the rGO/LDPE film prepared in the Preparation Example above were analyzed according to the following items.

1-1. Exterior of Film

Figure 8:
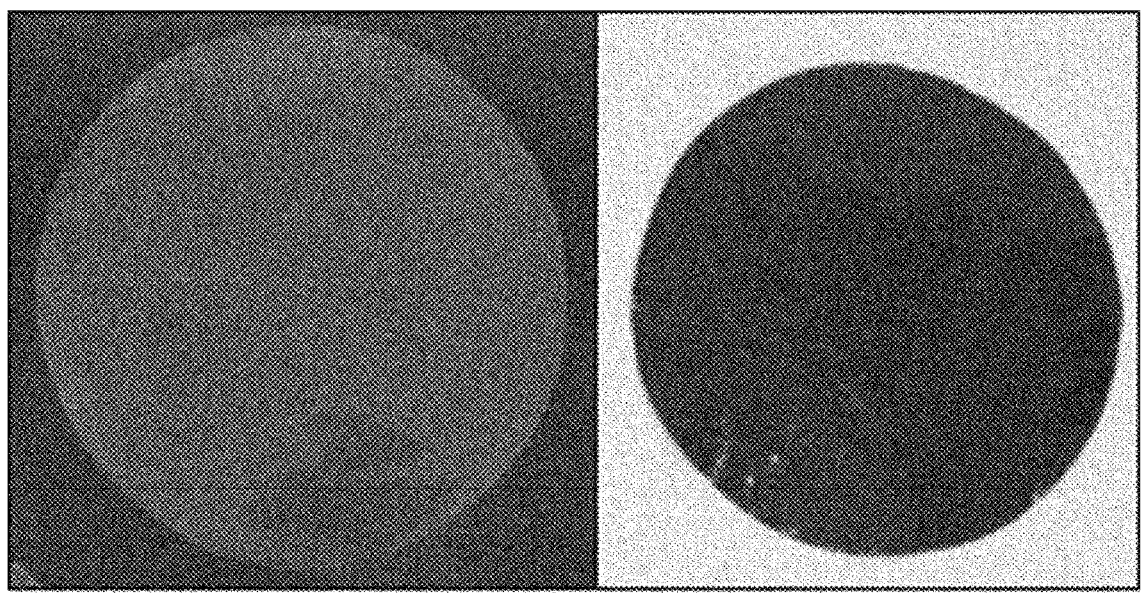
FIG. 8 is an image comparing the exteriors of the LDPE film and the rGO/LDPE film.

The exteriors of the LDPE film having an rGO content of 0% by weight and the rGO/LDPE film having an rGO content of 1% by weight in the Preparation Example above were compared and shown in FIG. 8.

It can be confirmed that the film made with only LDPE is a white translucent circular film, and the rGO/LDPE composite film is a black circular film.

1-2. Floating Characteristics of Film

Figure 9A:
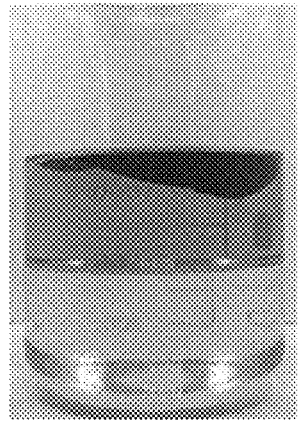
FIG. 9(*a*), FIG. 9(*b*), and FIG. 9(*c*) are images showing the position of an rGO/LDPE film according to the passage of time after placing the film into a beaker having water and oil therein.
Figure 9B:
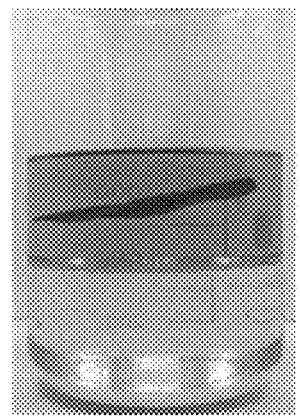
Figure 9C:
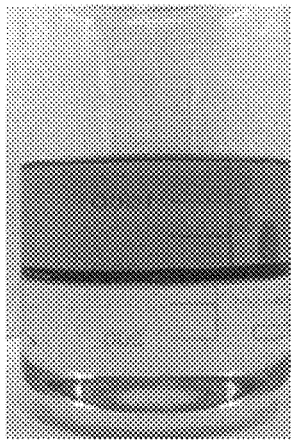

In order to check the floating characteristics of the rGO/LDPE film, the rGO/LDPE film with 1% by weight was placed in a beaker having water and oil therein, and then the position of the film according to the passage of time (a)→b) →c)) is shown in FIG. 9.

It can be confirmed that the rGO/LDPE film does not float on the oil but rather slowly sinks and is positioned at the interface between the water and oil.

Figure 10A:
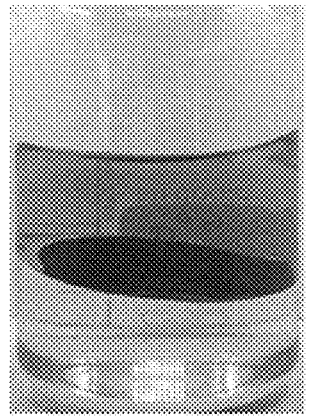
FIG. 10(*a*), FIG. 10(*b*), and FIG. 10(*c*) are images showing the position of the film according to the passage of time after applying an impact to the exterior part of the beaker of FIGS. 9(*a*)-9(*c*).
Figure 10B:
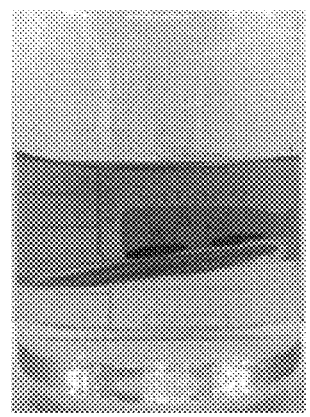
Figure 10C:
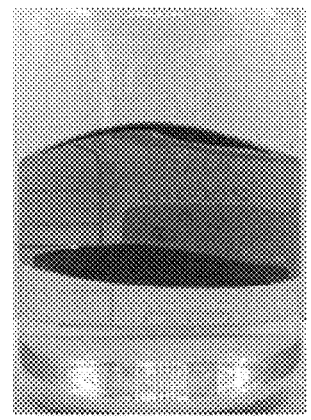

FIG. 10 shows the position of the film after applying an impact to the exterior part of the beaker according to the passage of time (a)→b)→c)). It can be confirmed that the film is stably positioned at the interface of the water and oil despite the large fluctuations of water and oil by the external impact.

1-3. Hydrophobicity and Lipophilicity of Film

Hydrophobicity and lipophilicity were checked by measuring the water contact angle (WCA) and the oil contact angle (OCA) of the rGO/LDPE films prepared by varying the proportion of rGO in the Preparation Example above.

Figure 11:
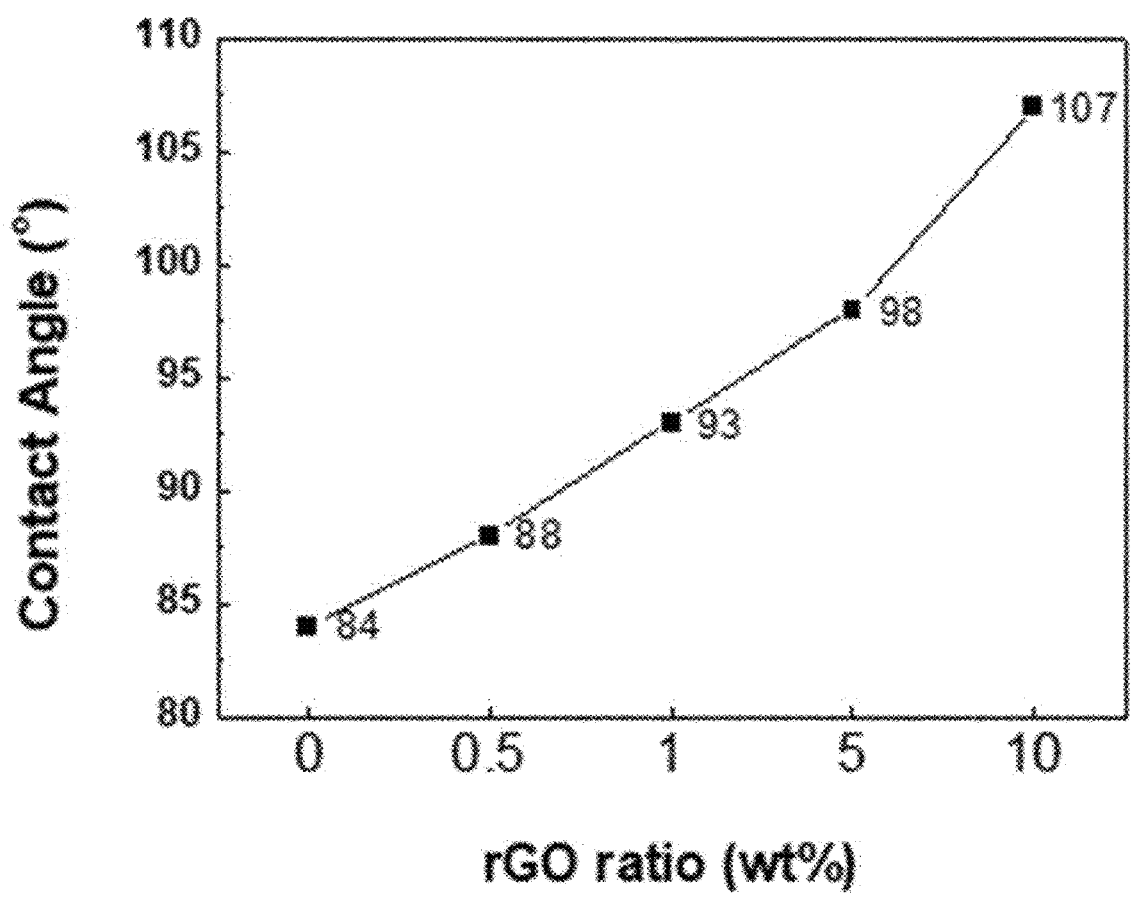
FIG. 11 is a graph showing the water contact angle of the film according to the content of rGO.

The results of measuring the water contact angle (WCA) of each film are shown in FIG. 11.

In FIG. 11, the water contact angle of the film is 84° when rGO is of 0% by weight and is 107° when rGO is of 10% by weight, confirming that the water contact angle increases as the proportion of rGO increases. In other words, it can be said that the hydrophobicity of the rGO/LDPE film increases as the proportion of rGO increases.

The oil contact angle was found to be 0° for all films as the oil spread over the films as soon as the oil was dropped onto the films.

That is, it can be seen that the rGO/LDPE film of the present invention has weak hydrophobicity and strong lipophilicity.

Experiment Example 2: Experiment of Floating Stability of Film

Figure 12:
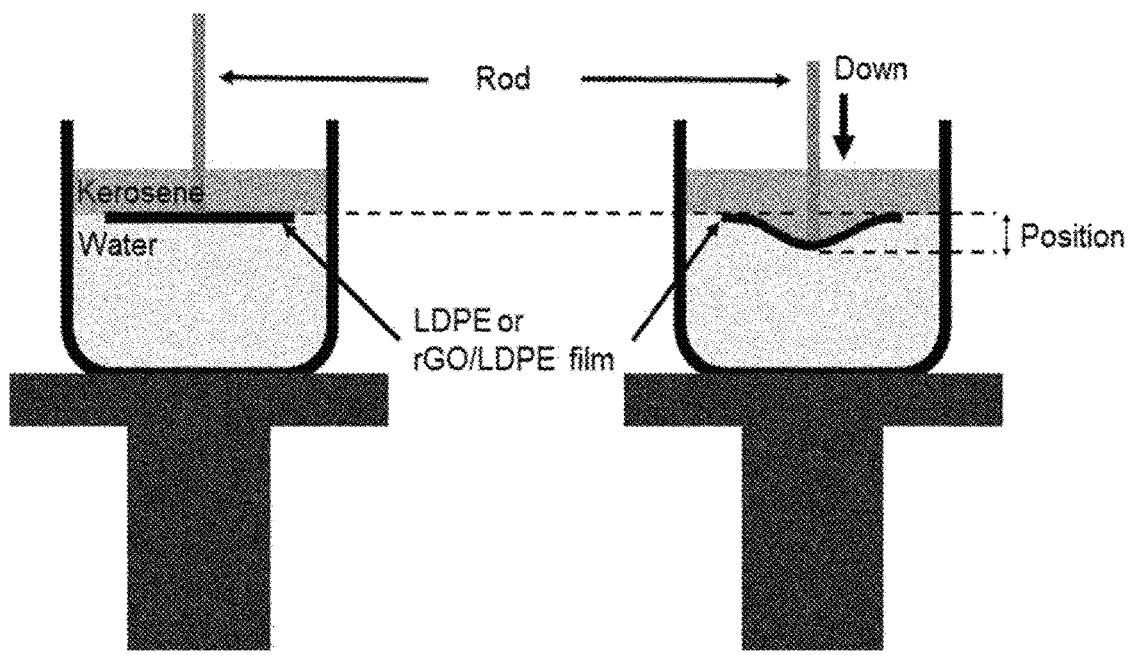
FIG. 12 is a schematic diagram of an experimental apparatus for checking the floating stability of a film in accordance with one experiment example of the present invention.

In order to analyze the floating stability of the rGO/LDPE film at the interface between water and oil, a dip coater was used to construct a measuring device as shown in FIG. 12.

The LDPE film and the rGO/LDPE composite film, each containing 0% by weight and 1% by weight of rGO, were cut into 4 cm, 5 cm, and 6 cm in diameter, respectively, by adjusting the pressure of the hot press.

Figure 13A:
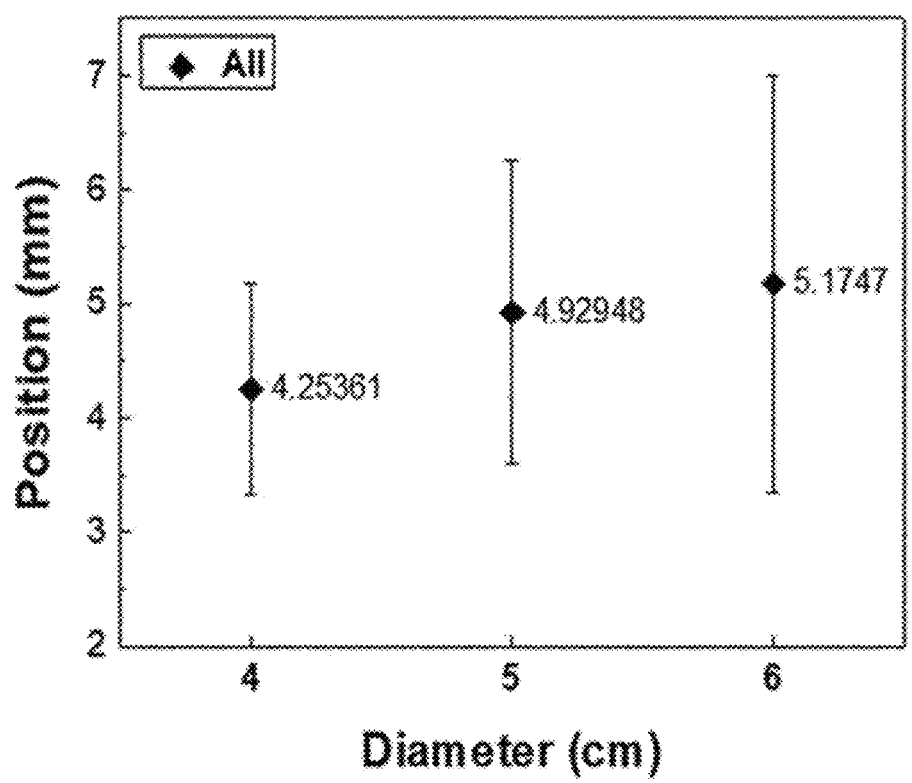
FIG. 13 (*a*) is a graph showing the average of immersion depths according to the diameter of films.
Figure 13B:
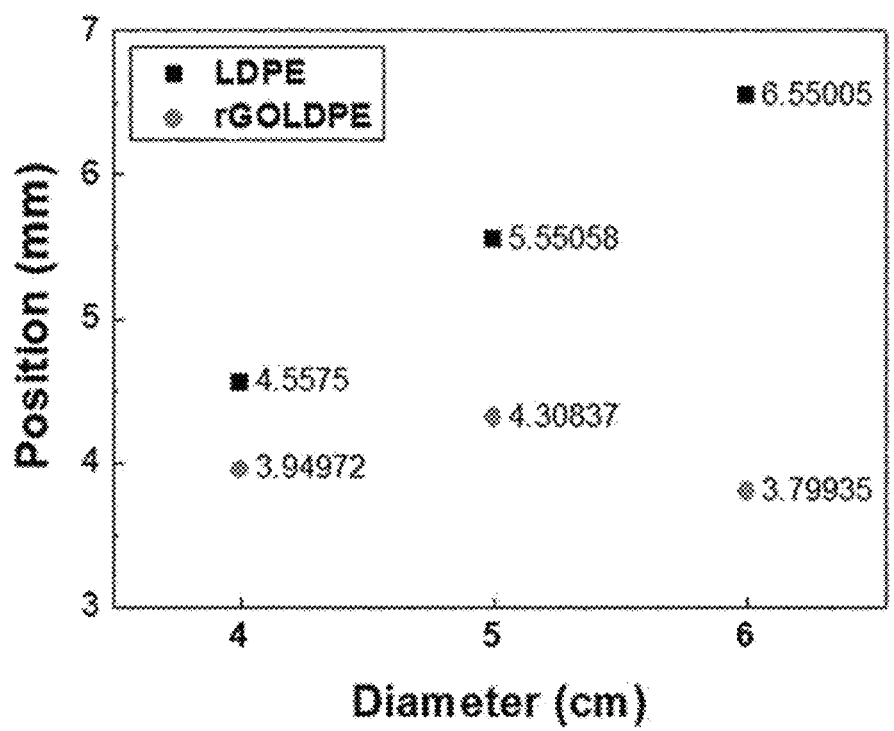
Figure 14A:
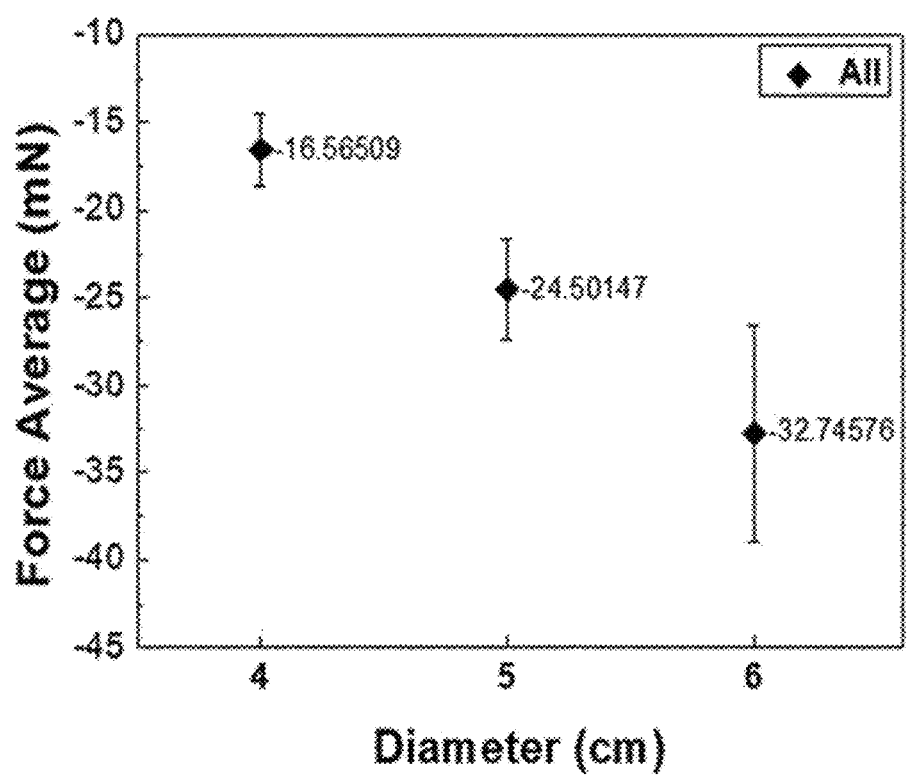
FIG. 14 (*a*) is a graph showing the magnitude of the force exerted on a bar according to the diameter of films.
Figure 14B:
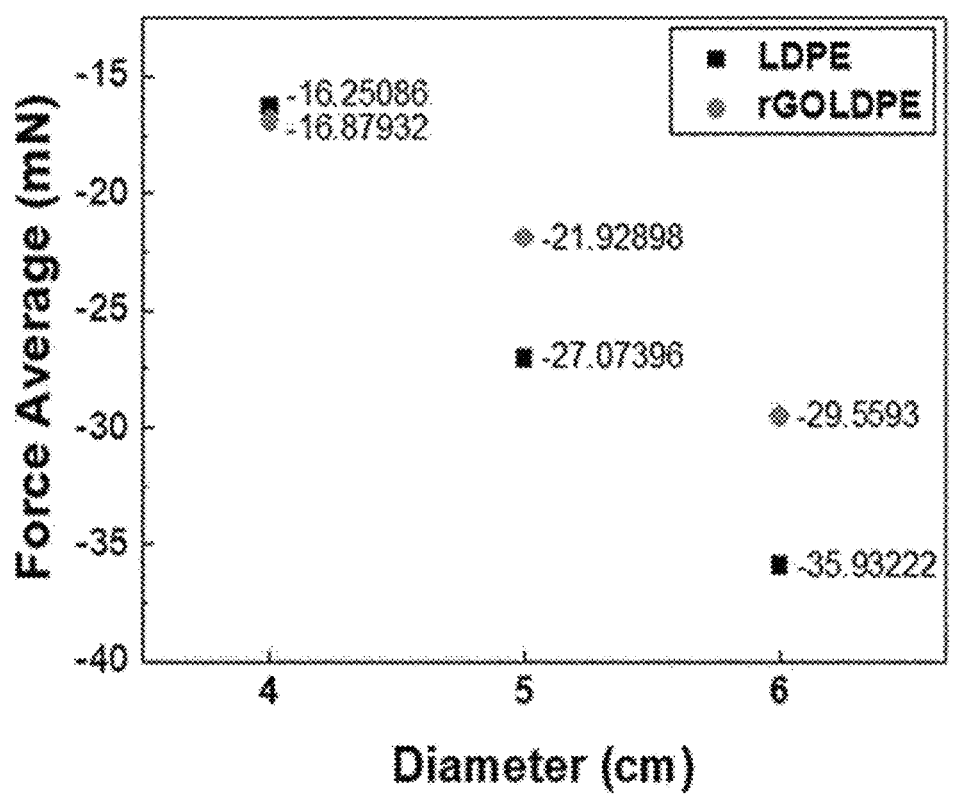
Figure 15A:
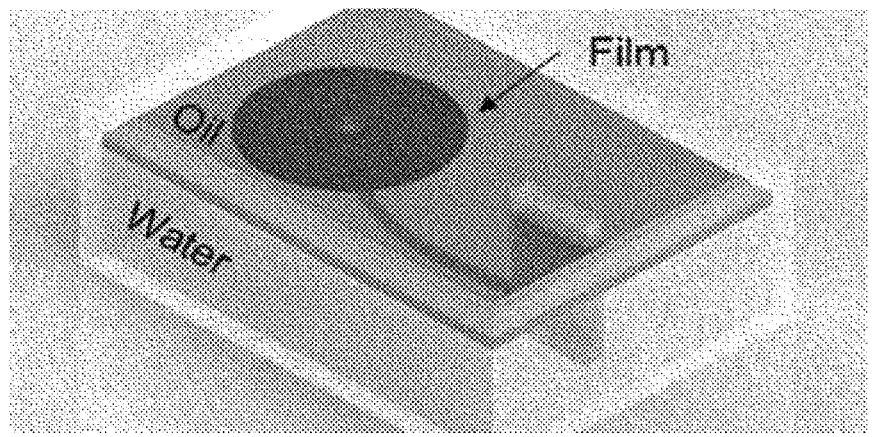
FIG. 15(*a*), FIG. 15(*b*), and FIG. 15(*c*) are a schematic diagram of a water/oil separation experimental apparatus in accordance with one experiment example of the present invention.
Figure 15B:
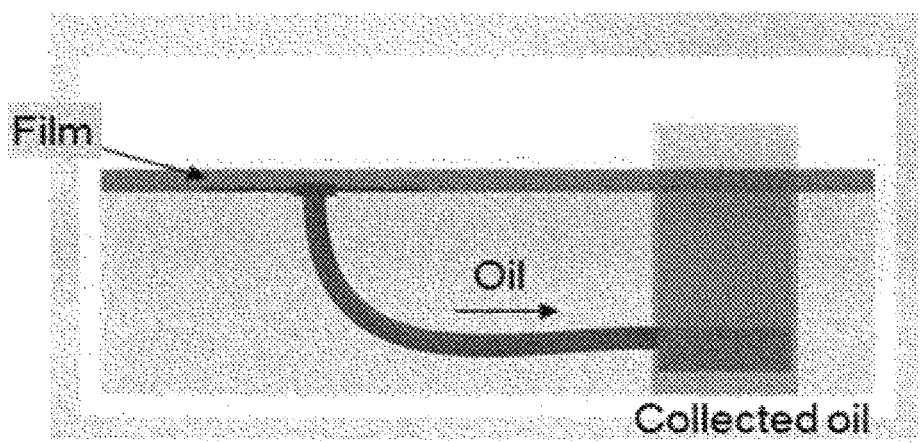
Figure 15C:
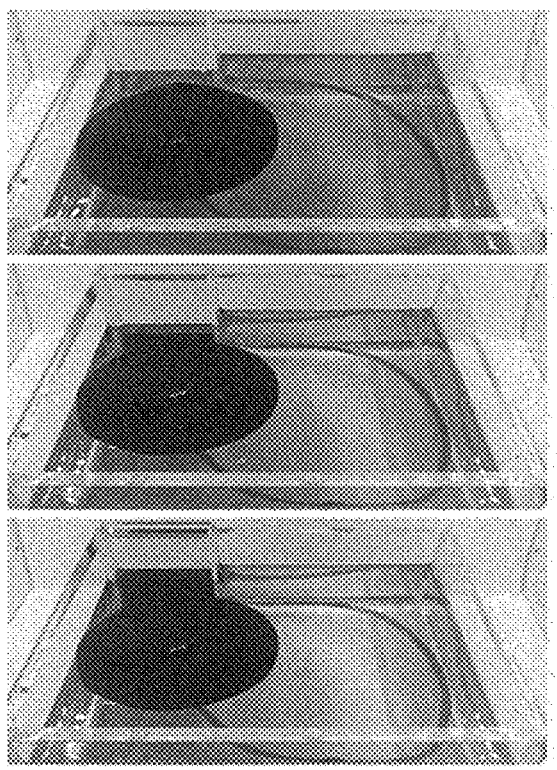
Figure 15C:
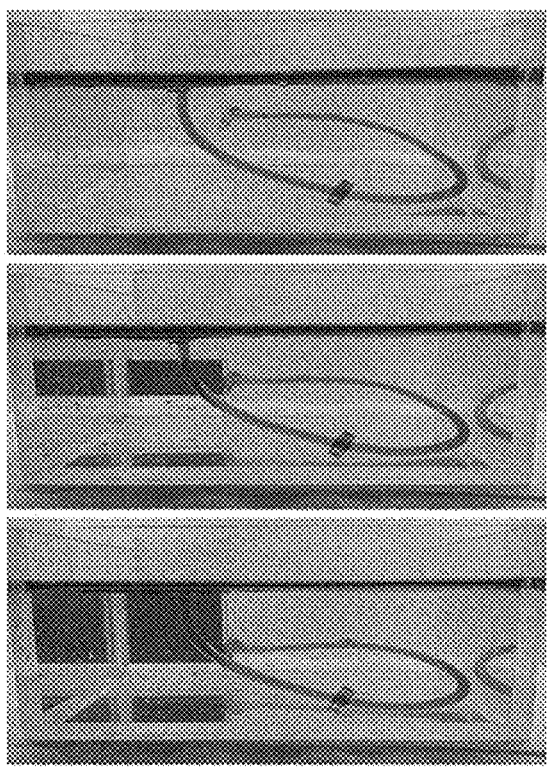

After placing the films at the interface between the water and oil and pressing them gently with a bar connected to the dip coater, the displacement while the films were being pressed and the force exerted on the bar by the films were measured, and the results of measuring the position and force when the water passed over the films are shown in FIGS. 13 and 14.

FIG. 13 (a) shows the average of the immersion depths according to the diameter of the films. It can be confirmed that the larger the diameter of the film, the deeper the immersion depth. This is because the larger the film, the greater the buoyancy exerted by the liquid.

FIG. 13 (b) shows the immersion depths according to the diameter of the LDPE film and the rGO/LDPE film. In the case of LDPE, the tendency was clearly shown that the larger the diameter, the deeper the immersion depth was.

However, in the case of rGO/LDPE film, it can be confirmed that the immersion depth increased from 3.9 mm to 4.3 mm when the diameter of the film increased from 4 cm to 5 cm, but the immersion depth became shallower again to 3.7 mm when the diameter was 6 cm. This is because the rGO/LDPE film with diameters of 4 cm and 5 cm was flat and thus was affected only by the buoyancy of the liquid, but the rGO/LDPE film of 6 cm was bent in shape and thus was greatly influenced by the shape of the film, rather than the buoyancy of the liquid.

It can be confirmed from FIGS. 14 (a) and (b) that as the diameter of the film increases, the force exerted during immersion increases, regardless of the types of films. For the same diameter, the force exerted on the LDPE film is greater than the force exerted on the rGO/LDPE film, this is because the LDPE film is thinner and more flexible than the rGO/LDPE film for the same diameter, and thus it goes in deeply along the interface and receives more force due to the thickness.

Experiment Example 3: Water/Oil Separation Test

In order to separate oil by using the difference in density between materials, an experimental apparatus as shown in FIG. 15 was constructed.

After filling ⅘ or so of a water tank with water, kerosene was added to form a layer of kerosene on the water. The rGO/LDPE film prepared in the Preparation Example above was allowed to float at the interface between the water and kerosene. A silicone tube was connected to the film, and a hole having the same size as the inner diameter of the tube was made in the film, so that the oil could flow along the silicone tube. The other end of the silicone tube was connected to the oil recovery container located in the water tank.

3-1. Analysis of Recovery Rate According to Tube Inner Diameter

The oil recovery rate according to the inner diameter of tubes was measured.

Silicone tubes with inner diameters of 2 mm, 3 mm, and 4 mm, respectively, were prepared and the above experiment was conducted. The oil recovery rates according to the inner diameter of the tubes are shown in FIG. 16.

Figure 16:
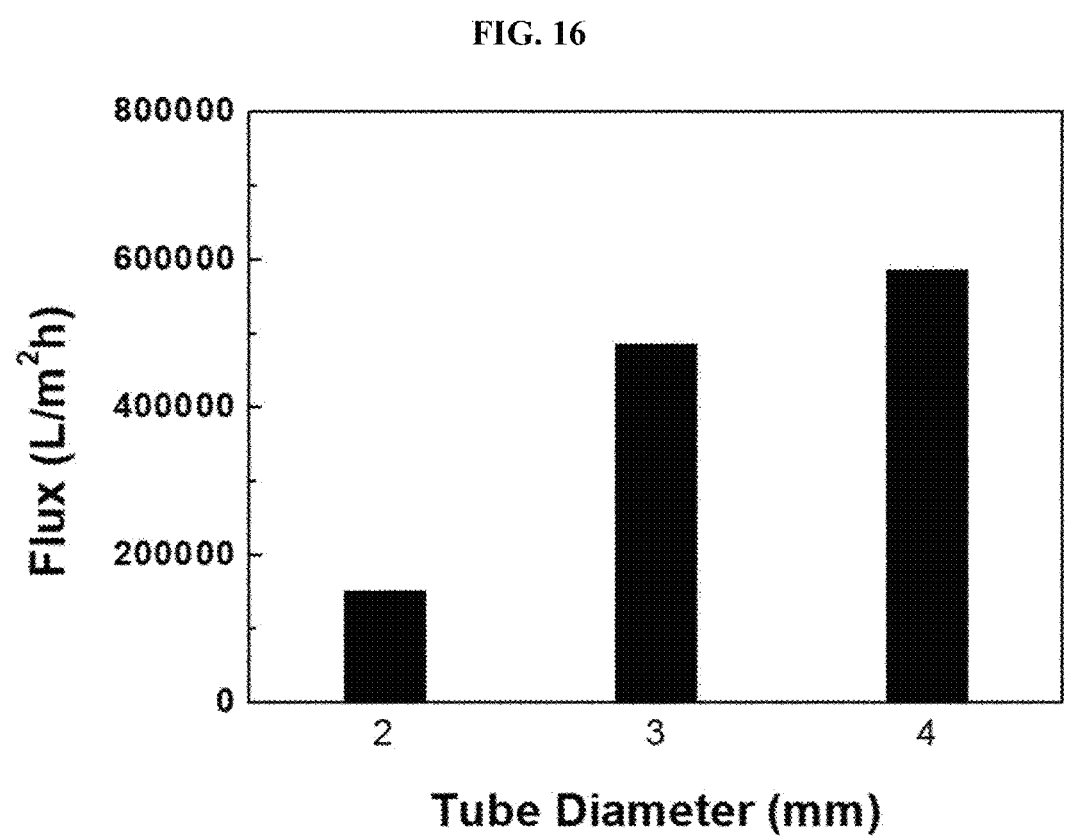
FIG. 16 is a graph showing oil recovery rates according to the inner diameter of tubes.

In FIG. 16, it was found that all three tubes had oil recovery rates exceeding 100,000 L/m$^2$ h. This is a remarkably excellent figure, exceeding the previously reported oil recovery rate by far.

Specifically, the oil recovery rate was 150,000 L/m$^2$ h or higher when a 2 mm tube was used in the experiment, and the recovery rate was about 500,000 L/m$^2$ h for the tubes of 3 mm or larger, which was an improvement of about 3-4 times higher than the recovery rate of the 2 mm tube. It can be seen that the oil recovery speed increased significantly, compared to the 2.25 times increase in the cross-section of the tube from 4 mm$^2$ to 9 mm$^2$.

In the case that the inner diameter of the tube increased from 3 mm to 4 mm, the cross-sectional area of the tube increased by about 1.7 times from 9 mm$^2$ to 16 mm$^2$, but the oil recovery rate increased by only 1.2 times to about 600,000 L/m$^2$ h.

Figure 17A:
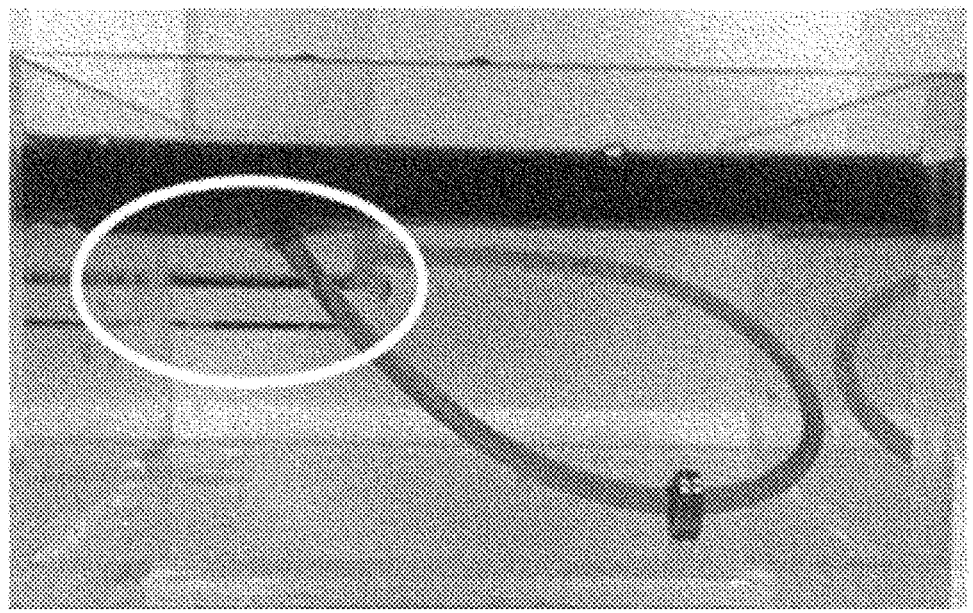
FIG. 17 (*a*) is an image of a device in which a recovery container is floating on the water of a water tank.
Figure 17B:
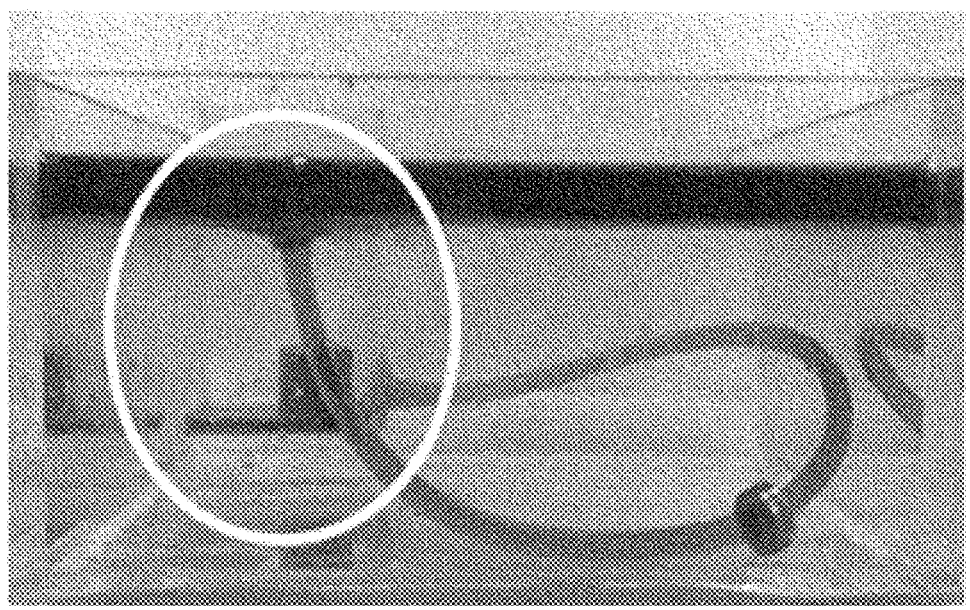

3-2. Analysis of Recovery Performance According to Location of Recovery Container In order to analyze the oil recovery performance according to the location of the oil recovery container, experiments were conducted on the state in which the oil recovery container floated on water and on the state in which the oil recovery container was sunk to the floor, as shown in FIG. 17. A tube with an inner diameter of 4 mm was used for the experiment. The results are shown in FIG. 18.

Figure 18:
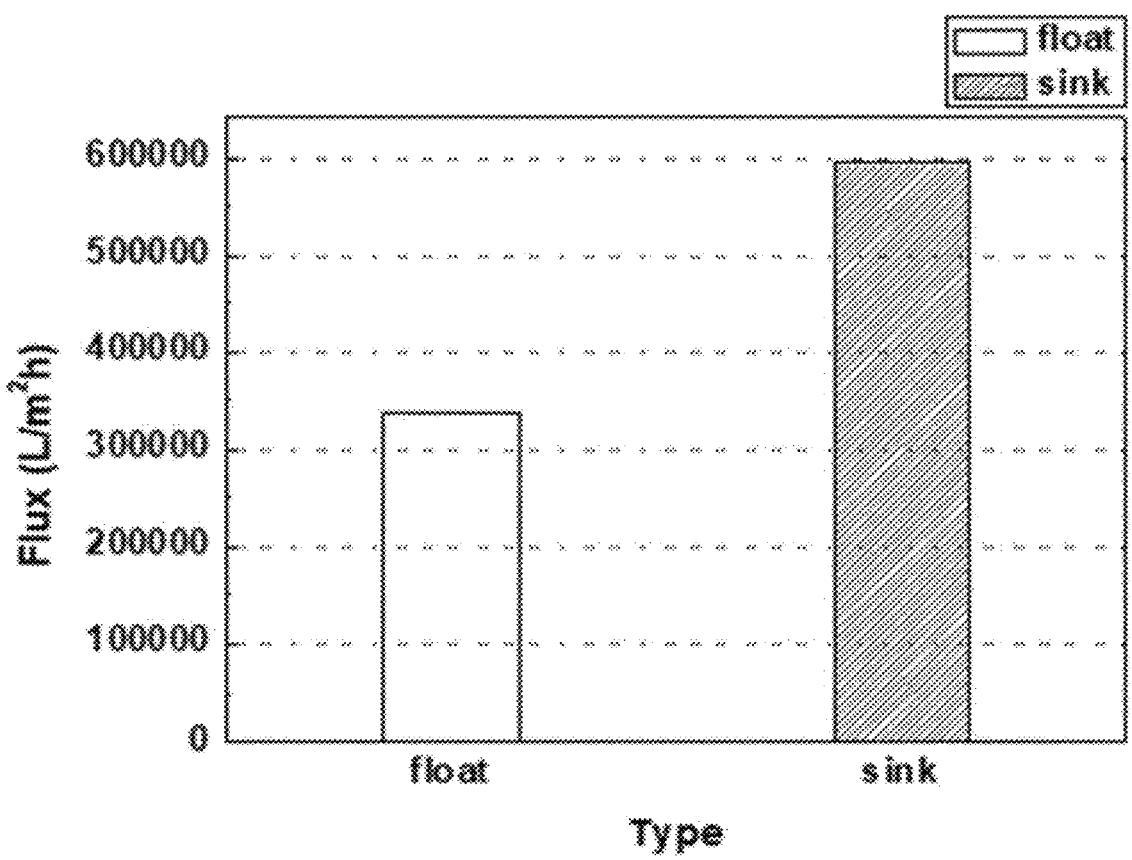
FIG. 18 is a graph showing oil recovery rates according to the location of a recovery container.

In FIG. 18, in the case that the experiment was started with the recovery container floating on the water, the oil recovery speed was 330,000 L/m² h on average, and in the case that the experiment was started with the recovery container sunk, the oil recovery speed was about 600,000 L/m² h.

That is, although both cases showed excellent oil recovery rates, it can be seen that the state in which the recovery container sunk in the water tank exhibits a faster oil recovery rate by about two times.

3-3. Analysis of Recovery Rate according to Oil Thickness

The oil recovery rate was analyzed by varying the thickness of the oil floating on the water.

The respective experiments were conducted with the thickness of the oil being 0.3 cm, 0.5 cm, 1.0 cm, 1.25 cm, 1.5 cm, and 2.0 cm, and the inner diameter of the tube was 4 mm.

Figure 19:
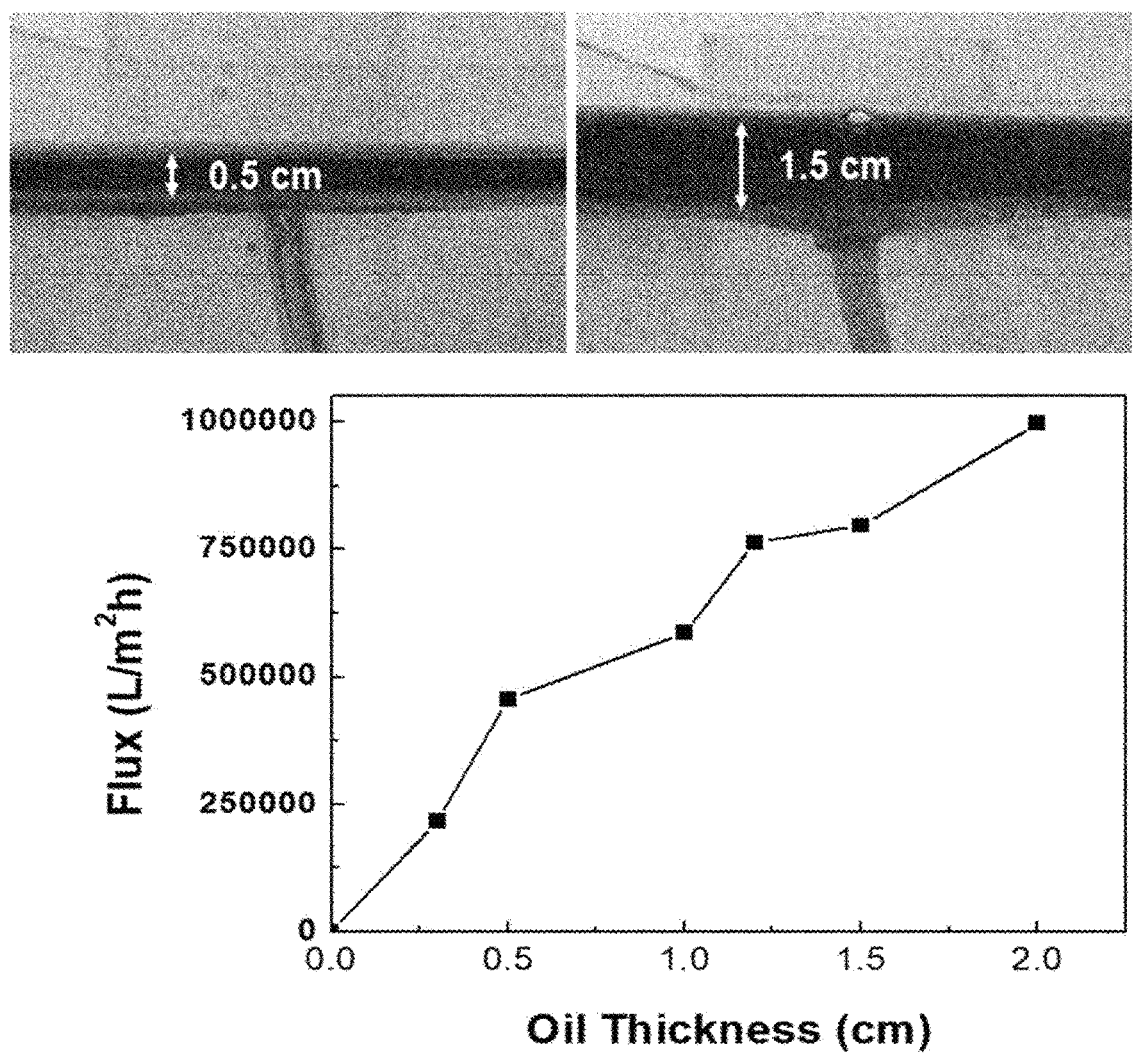
FIG. 19 is a graph showing oil recovery rates according to the thickness of oil.

As shown in FIG. 19, the recovery rate increased from about 200,000 L/m² h to about 1,000,000 L/m² h as the thickness of the oil increased from 0.3 cm to 2.0 cm.

This is because if the oil layer becomes thinner, the oil does not fill the entire interior of the tube, and the oil is recovered along the tube wall only. Therefore, it can be seen that if the inner diameter of a tube is increased, the oil must also be thick enough to exhibit the best oil recovery performance.

3-4. Analysis of Oil Recovery Performance According to Film Size

In order to analyze the oil recovery performance according to the size of the rGO/LDPE film, experiments were conducted with four sizes of films of 9.3 cm, 10.3 cm, 12.6 cm, and 13.95 cm in diameter.

Figure 20:
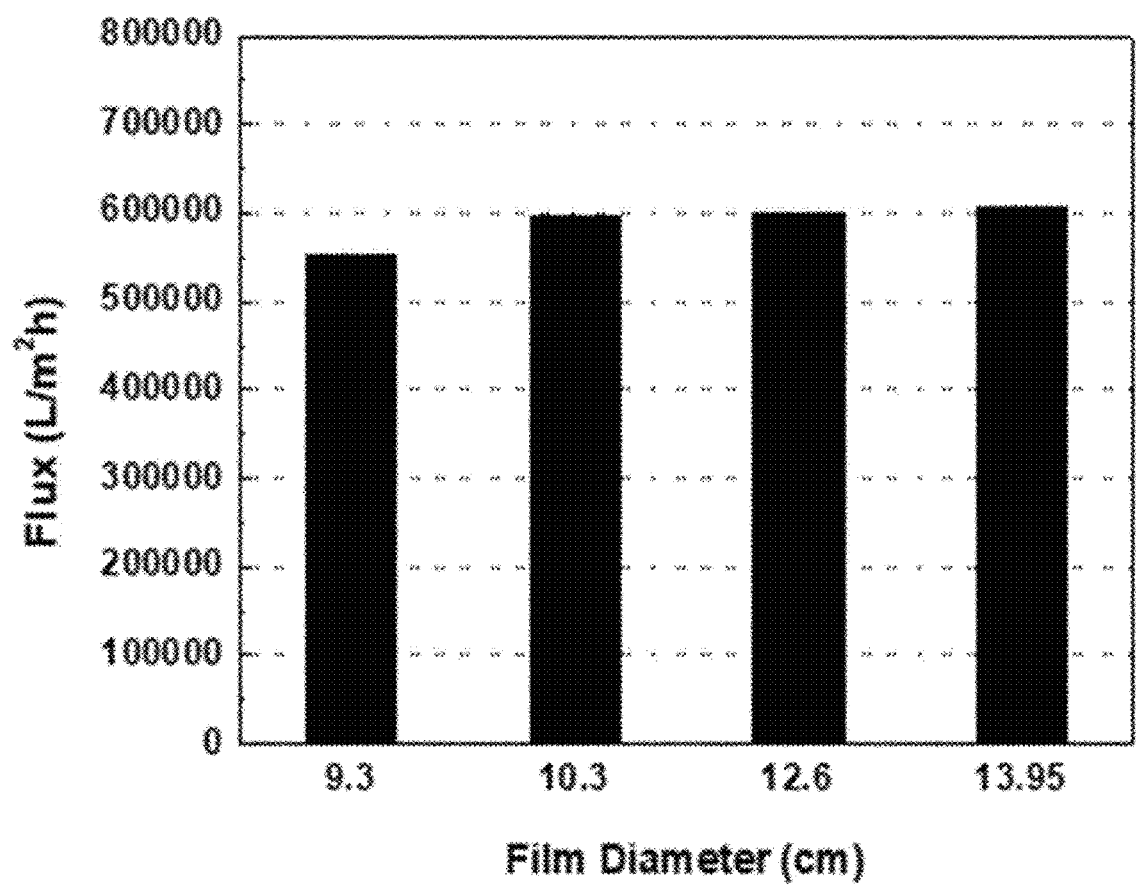
FIG. 20 is a graph showing oil recovery rates according to the diameter of films.

As can be confirmed from FIG. 20, it can be seen that all the films of four diameters showed about 600,000 L/m² h of oil recovery performance, indicating that the size of the film does not significantly affect the oil recovery rate.

However, the recovery rate is about 550,000 L/m² h when the diameter is 9.3 cm, which is somewhat lower than that of the films of other diameters, and it is understood that this is because the film is greatly affected by the buoyancy and rigidity of the connected tube as the film becomes smaller, and the film cannot be stably positioned along the interface between water and oil. If the film is of the size or larger that is less affected by the buoyancy and rigidity of the tube, the oil recovery rate would not be affected.

Figure 21:
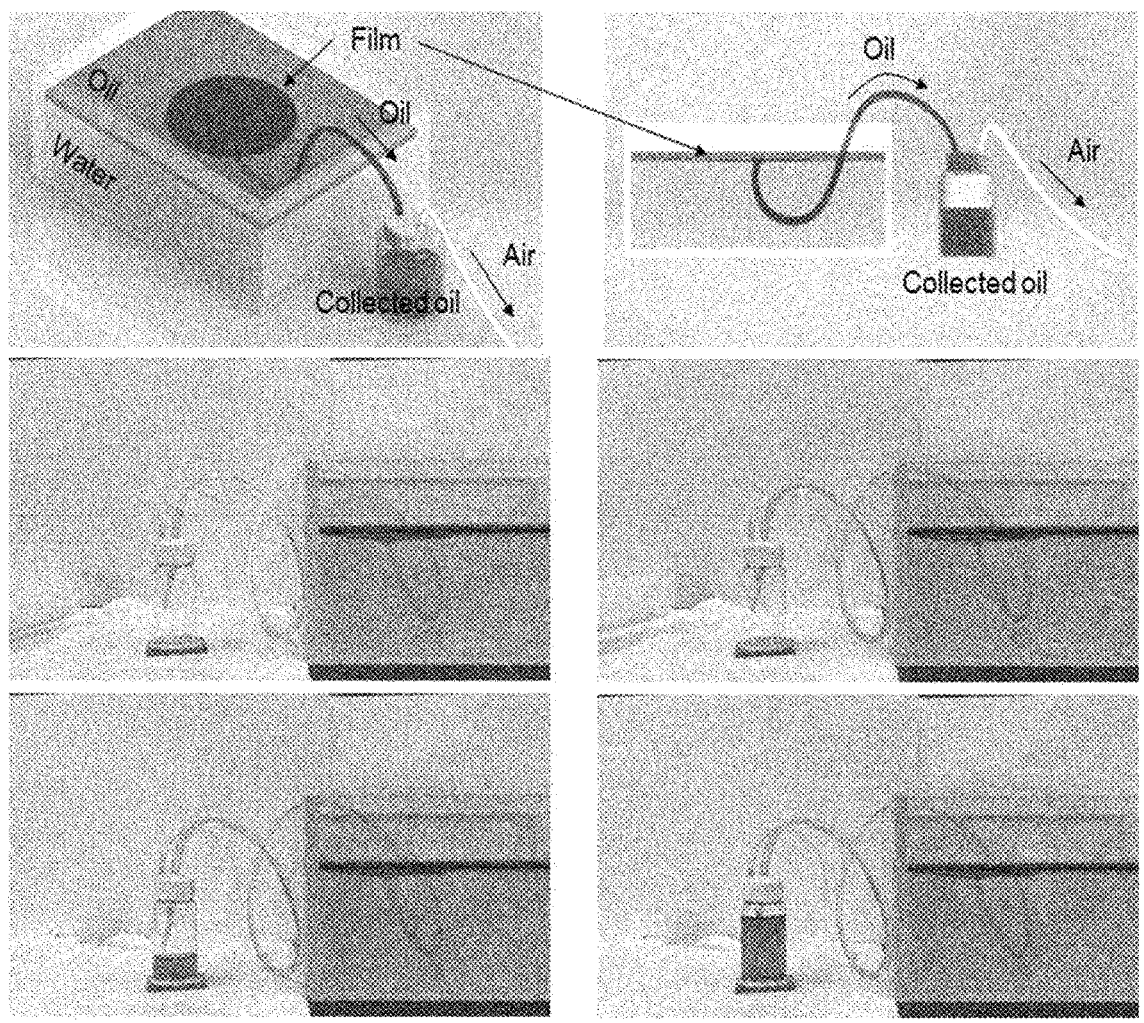
FIG. 21 shows a schematic diagram and images of a water/oil recovery device in which an oil recovery container is installed outside a water tank in accordance with one experiment example of the present invention.

Experiment Example 4: Test of a Water/Oil Separation Device in which the Recovery Container is Located Outside the Water Tank While configuring the same water/oil separation device as in Experiment Example 3 above, a device in which the oil recovery container was located outside the water tank was constructed, as shown in FIG. 21.

In the case of this device, since the tube crossed over the water tank and was higher than the water surface and thus could not recover oil, the recovery container was sealed and to which another tube through which the air inside the recovery container would escape was connected, to which a syringe was connected. The inner diameter of the tube was 3.2 mm. The oil recovery rate was measured and shown in FIG. 22.

Figure 22:
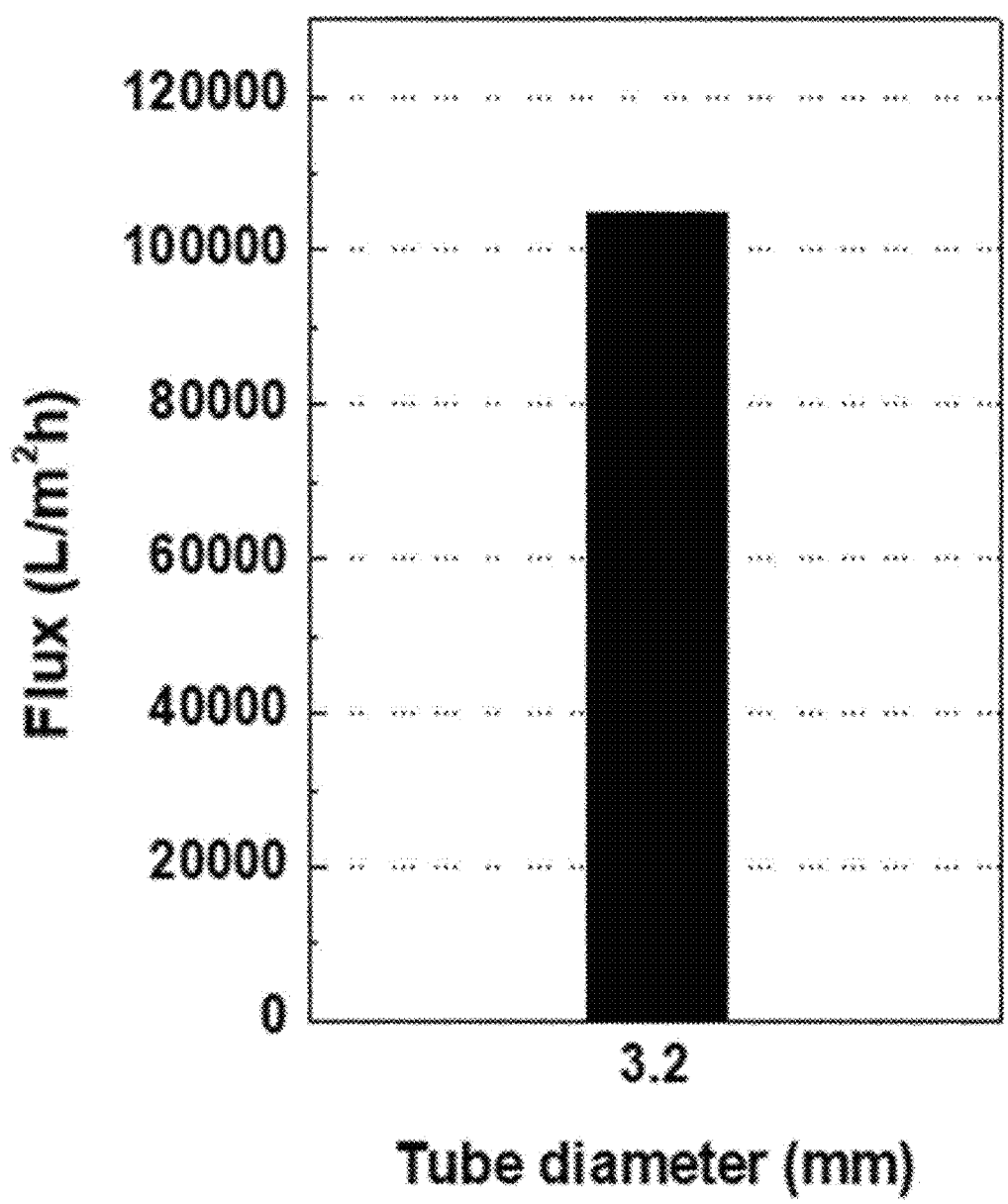
FIG. 22 is a graph showing the oil recovery rate of the device in which the oil recovery container is installed outside the water tank.

In FIG. 22, an oil recovery rate of about 100,000 L/m² h can be confirmed.

This is a value of about ⅙ compared to the tube with an inner diameter of 3 mm of Experiment Example 3 having a similar inner diameter, and is a value similar to the tube of 2 mm of Experiment Example 3 having a smaller inner diameter. It is understood that the speed decreased since the oil passed through the tube at a position higher than the water surface and received a force in the opposite direction rather than the direction to the recovery container. However, the oil recovery rate of this experiment also corresponds to a very high rate compared to the previously reported research results.

Although some implementations of the present invention have been described above, the present invention is not limited only to the implementations described above but can be modified and varied within the scope that does not depart from the subject matter of the present invention, and it should be understood that the forms to which such modifications and variations are applied also fall within the technical idea of the present invention.

What is claimed is:

1. A water-oil separation device for separating oil floating on water, comprising:
    (a) a polymer film having a density lower than a density of water and higher than a density of oil, so as to be configured to float between the water and the oil, and having a recovery hole for recovering the oil;
    (b) an oil recovery tube connected to the recovery hole and configured to move the oil located on the polymer film; and
    (c) an oil recovery container connected to an end of the oil recovery tube and configured to store recovered oil,
    wherein the polymer film is in a form of a composite film with a carbon-based material selected from the group consisting of graphene, graphene oxide, reduced graphene oxide, carbon nanotube, carbon fiber, carbonaceous nanoplate, and a combination thereof.

2. The water-oil separation device of claim 1, wherein the polymer film is selected from the group consisting of ultra-high-molecular-weight polyethylene (UHMWPE), ultra-low-molecular-weight polyethylene (ULMWPE), high-molecular-weight polyethylene (HMWPE), high-density polyethylene (HDPE), high-density cross-linked polyethylene (HDXLPE), cross-linked polyethylene (XLPE), medium-density polyethylene (HDPE), linear low-density polyethylene (LLDPE), low-density polyethylene (LDPE), very-low-density polyethylene (VLDPE), chlorinated polyethylene (CPE), isotactic polypropylene (iPP), syndiotactic polypropylene (sPP), atactic polypropylene (aPP), homo-polypropylene (homo-PP), random-polypropylene (random-PP), ter-polypropylene (ter-PP), block-polypropylene (block-PP), acrylonitrile butadiene styrene (ABS), poly(1-butene), polymethylpentene, and ethylene-vinyl acetate copolymer (EVA), and a combination thereof.

3. The water-oil separation device of claim 1, wherein the density of the polymer film is 0.50 to 1.030 g/cm³.

4. The water-oil separation device of claim 1, wherein the composite film contains 0.1 to 10% by weight of the carbon-based material based on weight of the polymer film.

5. The water-oil separation device of claim 1, wherein the oil recovery tube has an inner diameter of 2 mm or larger.

6. The water-oil separation device of claim 1, wherein a part where the oil recovery tube and the oil recovery container are connected, is located below a water surface.

7. The water-oil separation device of claim 1, wherein the composite film is prepared by a method comprising:
    (a) dissolving a polymer in a first solvent to prepare a polymer solution;
    (b) dispersing a carbon-based material in a second solvent to prepare a carbon-based material solution;
    (c) mixing the polymer solution and the carbon-based material solution;

(d) adding the mixed solution to a third solvent to obtain carbon/polymer composite particles; and (e) molding the carbon/polymer composite particles to prepare a carbon/polymer composite film.

8. The water-oil separation device of claim 7, wherein the first and second solvents are selected from the group consisting of toluene, xylene, hexane, cyclohexane, benzene, chlorobenzene, chloroform, butane, trichloroethylene, acetone, tetrachloride, diethyl ketone, methyl ethyl ketone, methyl propyl ketone, methylene chloride, phenol, tetrahydrofuran, diethyl ether, and a combination thereof.

9. The water-oil separation device of claim 7, wherein the molding is performed by hot pressing.

10. The water-oil separation device of claim 9, wherein the hot pressing is performed with a pressure of 10 to 10,000,000 N/m$^2$ at a temperature of 110 to 180° C.

11. The water-oil separation device of claim 1, wherein the polymer film comprises a film shape-maintaining means for maintaining a shape of the film.

12. The water-oil separation device of claim 1, wherein one or more of the polymer film and the oil recovery tube comprises a heat generating means.

\* \* \* \* \*